United States Patent
Srinivas et al.

(10) Patent No.: US 9,919,380 B2
(45) Date of Patent: Mar. 20, 2018

(54) SHAPING OF BRITTLE MATERIALS WITH CONTROLLED SURFACE AND BULK PROPERTIES

(71) Applicant: Coherent, Inc., Santa Clara, CA (US)

(72) Inventors: Ramanujapuram A. Srinivas, Santa Clara, CA (US); David M. Gaudiosi, Santa Rosa, CA (US); Timothy Booth, Penngrove, CA (US); Michael Shirk, Brentwood, CA (US); Eric Juban, Petaluma, CA (US); Michael Mielke, Petaluma, CA (US)

(73) Assignee: Coherent, Inc., Santa Clara, CA (US)

( * ) Notice: Subject to any disclaimer, the term of this patent is extended or adjusted under 35 U.S.C. 154(b) by 635 days.

(21) Appl. No.: 14/186,238

(22) Filed: Feb. 21, 2014

(65) Prior Publication Data
US 2014/0239552 A1    Aug. 28, 2014

Related U.S. Application Data

(60) Provisional application No. 61/768,467, filed on Feb. 23, 2013.

(51) Int. Cl.
*B23K 26/38*    (2014.01)
*B23K 26/50*    (2014.01)
(Continued)

(52) U.S. Cl.
CPC ...... *B23K 26/0081* (2013.01); *C03B 33/0222* (2013.01); *C03B 33/04* (2013.01)

(58) Field of Classification Search
CPC .... B23K 26/50; B23K 26/384; B23K 26/386; B23K 26/388
See application file for complete search history.

(56) References Cited

U.S. PATENT DOCUMENTS 4,044,936 A * 8/1977 Obersby ............. C03B 33/0955
                                                                219/121.6
4,319,119 A    3/1982 Runge
(Continued)

FOREIGN PATENT DOCUMENTS

GB         2331038 A     12/1999
JP       405104276 A      4/1993
(Continued)

OTHER PUBLICATIONS

International Preliminary Report on Patentability received for PCT Patent Application No. PCT/US2014/017729, dated Sep. 3, 2015, 16 pages.

(Continued)

*Primary Examiner* — Matthew Daniels
(74) *Attorney, Agent, or Firm* — Morrison & Foerster LLP

(57) ABSTRACT

Methods of and devices for forming edge chamfers and through holes and slots on a material that is machined using a laser, such as an ultrafast laser. The shaped material has predetermined and highly controllable geometric shape and/or surface morphology. Further, a method of and a device for preventing re-deposition of the particles on a material that is machined using a laser, such as an ultrafast laser. A fluid is used to wash off the particles generated during the laser machining process. The fluid can be in a non-neutral condition, with one or more chemical salts added, or a condition allowing the coagulation of the particles in the fluid, such that the particles can be precipitated to avoid the reattachment to the machined substrate.

19 Claims, 22 Drawing Sheets

(51) Int. Cl.
  *B23K 26/00* (2014.01)
  *C03B 33/02* (2006.01)
  *C03B 33/04* (2006.01)

(56) References Cited

U.S. PATENT DOCUMENTS

| | | | | |
|---|---|---|---|---|
| 4,467,168 | A * | 8/1984 | Morgan | C03B 33/082 |
| | | | | 219/121.67 |
| 5,073,694 | A * | 12/1991 | Tessier | B23K 26/146 |
| | | | | 219/121.7 |
| 5,750,035 | A * | 5/1998 | Shepperd, III | C02F 1/5245 |
| | | | | 210/719 |
| 6,091,749 | A | 7/2000 | Hoffmaster et al. | |
| 6,362,453 | B1 * | 3/2002 | Wang | B23K 26/18 |
| | | | | 216/24 |
| 6,621,040 | B1 | 9/2003 | Perry et al. | |
| 6,642,476 | B2 * | 11/2003 | Hamann | B23K 26/0608 |
| | | | | 219/121.7 |
| 6,787,733 | B2 | 9/2004 | Lubatschowski et al. | |
| 7,847,213 | B1 | 12/2010 | Anikitchev | |
| 2001/0050312 | A1 * | 12/2001 | Koide | B23K 26/18 |
| | | | | 235/454 |
| 2002/0162973 | A1 | 11/2002 | Cordingley et al. | |
| 2002/0169379 | A1 | 11/2002 | Camacho et al. | |
| 2003/0217568 | A1 * | 11/2003 | Koyo | B23K 26/073 |
| | | | | 65/105 |
| 2005/0001166 | A1 | 1/2005 | Sanzari | |
| 2005/0122525 | A1 | 6/2005 | Borden et al. | |
| 2005/0236378 | A1 | 10/2005 | Boyle | |
| 2005/0255715 | A1 | 11/2005 | Cheng et al. | |
| 2006/0091125 | A1 | 5/2006 | Li et al. | |
| 2006/0096426 | A1 | 5/2006 | Park | |
| 2006/0201983 | A1 | 9/2006 | Kusama et al. | |
| 2006/0237397 | A1 | 10/2006 | Yamasaki et al. | |
| 2007/0012665 | A1 | 1/2007 | Nelson et al. | |
| 2007/0084837 | A1 | 4/2007 | Kosmowski | |
| 2007/0151961 | A1 | 7/2007 | Kleine et al. | |
| 2007/0158320 | A1 | 7/2007 | Kuo et al. | |
| 2007/0166965 | A1 | 7/2007 | Tanaka et al. | |
| 2007/0215581 | A1 | 9/2007 | Kato et al. | |
| 2008/0029152 | A1 | 2/2008 | Milshtein et al. | |
| 2008/0264910 | A1 | 10/2008 | Kashyap et al. | |
| 2009/0045176 | A1 | 2/2009 | Wawers et al. | |
| 2010/0032416 | A1 | 2/2010 | Jeong et al. | |
| 2010/0089882 | A1 | 4/2010 | Tamura | |
| 2010/0147813 | A1 * | 6/2010 | Lei | B23K 26/4075 |
| | | | | 219/121.72 |
| 2010/0240155 | A1 | 9/2010 | Chang et al. | |
| 2011/0207328 | A1 | 8/2011 | Speakman | |
| 2011/0240616 | A1 | 10/2011 | Osako et al. | |
| 2011/0287607 | A1 | 11/2011 | Osako et al. | |
| 2012/0156875 | A1 | 6/2012 | Srinivas et al. | |
| 2015/0110991 | A1 * | 4/2015 | Miwa | C03B 33/076 |
| | | | | 428/77 |

FOREIGN PATENT DOCUMENTS

| | | |
|---|---|---|
| JP | 11-123583 A | 5/1999 |
| JP | 2003-145287 A | 5/2003 |
| WO | WO2007000194 A1 | 4/2007 |
| WO | 2009/050938 A1 | 4/2009 |
| WO | WO 2012157610 A1 * | 11/2012 ........... C03B 33/076 |

OTHER PUBLICATIONS

International Search Report and Written Opinion received for PCT Patent Application No. PCT/US2014/017729, dated Jun. 18, 2014, 18 pages.

\* cited by examiner

SHAPING OF BRITTLE MATERIALS WITH CONTROLLED SURFACE AND BULK PROPERTIES

CROSS-REFERENCE TO RELATED APPLICATION(S)

This application claims priority under 35 U.S.C. § 119(e) of the U.S. Provisional Patent Application Ser. No. 61/768,467, filed Feb. 23, 2013 and titled, "SHAPING OF BRITTLE MATERIALS WITH CONTROLLED SURFACE AND BULK PROPERTIES," which is hereby incorporated by reference in its entirety for all purposes.

FIELD OF THE INVENTION

The present invention relates to material processing. More specifically, the present invention relates to systems for and methods of shaping brittle materials.

BACKGROUND OF THE INVENTION

Shaping is a material modification process that often involves the application of chemical processes and/or mechanical forces to materials, particularly brittle materials, such as glass, sapphire, or silicon. Other common examples of materials that are often processed to create products via shaping include, but are not limited to, amorphous solid materials, crystalline materials, semiconducting materials, crystalline ceramics, polymers, and resins.

Typical techniques for shaping brittle materials include mechanical saw processes, scribe and break, direct laser machining, laser thermal shock cleaving, mechanical grinding, mechanical polishing, abrasive liquid erosion, flow honing, chemical etching, or a combination of mechanical, laser, liquid and chemical steps. Although the net results of these techniques are somewhat different from one another, they all share the drawback of insufficient control of the as-shaped surface or bulk properties.

Brittle materials are used in multiple commercial markets for consumer, industrial and medical goods. There are aspects to be taken into consideration when processing and manufacturing products with brittle materials.

In the aspect of a material cutting/processing speed, multiple figures of merit (FOM) are used in commercial markets for quantifying the effective brittle materials shaping speed. For example, the linear cutting speed can be calculated by dividing the total length of material cut by the total cutting time, which generates an effective cutting speed with measurement units in meters per second (m/s). Depending on the exact material species, material thickness and desired surface characteristics, the effective cutting speed can also be in the units of millimeters per second (mm/s).

Takt time, cycle time, is another example of an FOM for quantifying the effective shaping speed for brittle materials, which is the time required to produce a unit of the shaped portion of brittle material from an initial substrate of brittle material. The Takt time for a production line is often characterized by number of seconds, or minutes, required to produce a unit. The Takt time calculation can include the linear cutting speed as a variable. The Takt time can also include additional steps required to produce the finished unit as variables in the calculation, such as grinding, polishing, etching, annealing, chemical bath, or ion-exchange treatment.

In the material property aspect, brittle materials can be characterized by the lack of plastic deformation prior to breaking when a stress is applied to the material. When subjected to stress, a brittle material breaks without significant deformation (strain). This property is not exclusive of strength, since some brittle materials can be very strong, such as diamond, sapphire or strengthened glass.

In the manufacturing aspect, brittle materials can be especially challenging to shape (e.g., cut, drill or mill), with controlled surface properties since these materials tend to chip and/or crack using typical methods. These defects are usually the result of "brittle fracture," which are cracks that propagate through a stressed material along paths of least resistance. The intrinsic microscopic stress anisotropy of brittle materials, and/or the randomized local stress applied by traditional shaping tools, imposes uncontrolled surface shape and/or surface morphology on the as-shaped edge. This uncontrolled edge quality can result from cracks running along transgranular pathways in the brittle material tracing the lattice orientation within each microscopic grain element in the material. Similarly, the uncontrolled edge quality can result from cracks running along intergranular pathways in the brittle material traversing the grain boundaries between individual grain elements in the material. The limitations of controlling the as-cut edge quality of a brittle material with traditional techniques are depending upon the grain size in the material and/or the dislocation mobility allowed by the grain structure.

Typical methods of shaping brittle materials fail to control the as-shaped surface shape and/or surface morphology since they apply a force (such as mechanical and/or thermal) that often leads to crack propagation along native crystallographic planes of high shear stress of the brittle material. Defects within the bulk of the brittle material substrate can be the result of the crystal growth process, impurities, or the stochastic grain pattern. Similarly, defects at the surface of the brittle material substrate can result from the crystal growth process, impurities, the stochastic grain pattern, or the substrate forming process, e.g., melting, drawing, fusing, slicing, lapping or machining. The uncontrolled crack propagation common with the typical methods can be caused by the shaping tool. Mechanical shaping tools can have microscopically random shapes, hardnesses, and/or applied forces. Thermal shaping tools can create microscopically random heat distributions in the brittle material.

FIG. 1A illustrates a typical method 100 of cutting a stock of brittle material 101 (hereinafter "material" 101) using a typical tool 102 such as a mechanical diamond-tipped saw. When the typical tool 102 is applied on the material 101, a cutting/breaking/cracking line 104 is created. A first portion 106 and a second portion 108 are formed by separating the material 101 into two or more pieces. The material 101, such as a brittle material, forms rough surfaces 110 when the typical tool 102 is applied to cut the material 101.

FIG. 1B illustrates three rough surfaces 112, 114, and 116 made by using typical methods and devices for cutting a brittle material. The rough surfaces 112, 114, and 116 have respectively large, medium and small roughness profiles of the brittle material 101 created by application of the typical tool 102. When the size (length in any directions) of the defect 118 is greater than a size of a critical defect, such as equal to or greater than 10~20 microns, the brittle material 101 can crack or become easy to break at a predetermined amount of impact of force.

Although the typical methods of and devices for brittle materials surface shaping have allowed shaping into predetermined shapes, these typical methods and devices impose uncontrollable surface properties in the resultant surface as shown in FIG. 1B. Multiple process fabrication protocols are therefore required in the typical process and methods, whereby the shaped surface is subsequently conditioned to achieve the desired surface properties, which are time consuming and associated with higher manufacturing costs. For example, an electronic display panel comprising thin glass typically exhibits micro-cracks and chips of uncontrolled dimensions along the shaped surface(s), and these features are typically removed via multiple steps of fine grit polishing of the surface(s) in the typical methods. Polishing, grinding, lapping, etching, sanding, annealing, and/or chemical bath are part of the subsequent steps for after-shaped edge treatment process in the typical methods.

SUMMARY OF THE INVENTION

According to some embodiments, the present invention is directed toward methods of and systems for material shaping. In some embodiments, the methods and systems include directing one or more tools to a portion of brittle material causing separation of the material into two or more portions, where the as-shaped surface has a predetermined and highly controllable geometric shape and/or surface morphology. The one or more tools can comprise energy delivered to the material without making physical contact, for example from a laser beam or acoustic beam. In some embodiments, one or more of the separated portions of material comprise fragmented or particulate material and can further comprise waste debris.

In some embodiments, the present invention is directed toward devices that shape brittle material. These devices comprise tools, or combinations of tools, for separating a brittle material into two or more portions, where the as-shaped edge has a predetermined and highly controllable geometric shape and/or surface morphology. The one or more tools comprise energy delivered to the material without making physical contact, for example from a laser beam or acoustic beam. In some embodiments, one or more of the separated portions of material comprise fragmented or particulate material and can further comprise waste debris.

In some embodiments, the present invention is directed toward the separate portions of a material created by a process. In some embodiments, the process includes: (a) providing a stock of brittle material and (b) applying one or more laser beams to a portion of the brittle material causing separation of the material into two or more portions in a way that precisely controls the geometric shape and/or surface morphology of the edge(s) of at least one of the separate portions. In some embodiments, one or more of the separated portions of material comprise fragmented or particulate material and can further comprise waste debris.

In one exemplary embodiment, the present invention is directed toward methods of and systems for brittle material shaping. The methods and systems include directing one or more laser beams to a portion of the brittle material causing a separation of the material into two or more portions, where at least one of the portion surfaces created by the laser beam exposure have a predetermined and highly controllable geometric shape and/or surface morphology. In some embodiments, one or more of the separated portions of material comprise fragmented or particulate material and can further comprise waste debris.

In another exemplary embodiment, the present invention is directed to devices that shape brittle materials. These devices comprise one or more lasers and the laser beam directing mechanisms for exposing a portion of the brittle material to the laser light causing separation of the brittle material into two or more portions, where at least one of the resultant portion surfaces created by the laser exposure have a predetermined and highly controllable geometric shape and/or surface morphology. It will be appreciated that the laser beam directing mechanisms can include changing the path of the laser beam, changing the location or orientation of the work piece, or all in combination. In some embodiments, one or more of the separated portions of material comprise fragmented or particulate material and can further comprise waste debris.

In an additional exemplary embodiment, the present invention is directed to the separate portions of a brittle material created by a process. The process includes: (a) providing a stock of brittle material and (b) applying one or more laser beams to a portion of the brittle material causing separation of the material into two or more portions in a way that precisely controls the geometric shape and/or surface morphology of the surfaces(s) of at least one of the separated portions. In some embodiments, one or more of the separated portions of material comprise fragmented or particulate material and can further comprise waste debris.

More aspects of the invention are provided herein. In some embodiments, a liquid assisted material processing apparatus comprises a laser, a material holder, and a fluid cleaning system providing a fluid in contact with a material on the material holder. In some embodiments, the fluid cleaning system comprises a reservoir. In other embodiments, the fluid comprises a salt. In some other embodiments, the salt comprises NaCl. In some embodiments, the salt comprises a divalent salt. In other embodiments, the divalent salt comprises $CaCl_2$, $MgCl_2$, or a combination thereof. In some other embodiments, the fluid comprises a non-neutral fluid. In some embodiments, the non-neutral fluid comprises a pH value lower than 4. In other embodiments, the non-neutral fluid comprises a pH value greater than 7.2. In some other embodiments, the fluid has a zeta-potential lower than 8. In some embodiments, the fluid facilitates the coagulation of the particles that are generated from the material.

In another aspect, a method of processing a material comprises placing a material on a holder, applying a laser beam to the material, and using a fluid to remove particles generated at the material due to the application of the laser beam. In some embodiments, the method comprises coagulating the particles in the fluid, such that the reattachment of the particles to the material is avoided. In other embodiments, the method comprises reducing a zeta potential. In some other embodiments, method comprises adding a salt. In some other embodiments, the salt comprises $CaCl_2$, $MgCl_2$, NaCl, or a combination thereof. In some embodiments, the salt comprises a divalent salt. In some other embodiments, the fluid comprises a non-neutral fluid. In some embodiments, the non-neutral fluid has a pH value lower than 5. In other embodiments, the particles comprise nanoparticles, microparticles, or a combination thereof. In some other embodiments, the particles comprise colloidal silica. In some embodiments, the method comprises scanning the laser beam from a distal side of the material toward a proximal side of the material.

In another aspect, a method of forming a through-feature on a brittle material comprises applying a laser beam on a brittle material, forming a beveled through-hole on the brittle material, controlling the geometric shape and/or surface morphology of the brittle material. In some embodiments, the laser beam comprises an ultrafast laser pulse. In other embodiments, the laser beam comprises a femtosecond laser pulse. In some other embodiments, the beveled through-hole comprises a countersink structure. In some embodiments, the beveled through-hole comprises an angled chamfer. In other embodiments, the beveled through-hole comprises a round corner. In some other embodiments, the brittle material comprises a multiple layered structure. In some embodiments, the method comprises applying a laser pulse to one layer of the multiple layer material. In other embodiments, the brittle material comprises a glass. In some other embodiments, the brittle material comprises a consumer electronic protective glass.

In another aspect, a method of forming an edge chamfer, or bevel, on a brittle material comprises applying a laser beam on a brittle material and forming a chamfer or bevel on the brittle material. In some embodiments, the laser beam comprises laser pulses with pulse duration less than about 100 nanoseconds. In some embodiments, the laser beam comprises laser pulses with pulse duration less than 100 picoseconds. In some embodiments, the laser beam comprises laser pulses with pulse duration less than about 1000 femtoseconds. In some embodiments, the method comprises applying a laser pulse to one layer of the multiple layer material. In other embodiments, the brittle material comprises a glass. In some other embodiments, the brittle material comprises a consumer electronic protective glass.

In another aspect, a method of forming an edge chamfer on a brittle material comprising applying a laser beam on a brittle material, forming an edge chamfer on the brittle material, and controlling the geometric shape or surface morphology of the brittle material. In some embodiments, the laser beam comprises an ultrafast laser pulse in a picosecond to femtosecond time scale. In other embodiments, the laser beam comprises a femtosecond laser pulse. In some other embodiments, the chamfer comprises a flat surface that is angled with respect to a body of the brittle material. In some embodiments, the chamfer comprises a flat surface that has an angle of at least 10 degrees with respect to a body of the brittle material. In other embodiments, the edge chamfer comprises a round corner. In some embodiments, the brittle material comprises a multiple layered structure. In some embodiments, the method further comprises applying a laser pulse to one layer of the multiple layer material. In other embodiments, the brittle material comprises a glass. In some embodiments, the brittle material comprises sapphire. In other embodiments, the brittle material comprises a consumer electronic protective glass.

Other features and advantages of the present invention will become apparent after reviewing the detailed description of the embodiments set forth below.

BRIEF DESCRIPTION OF THE DRAWINGS

Embodiments will now be described by way of examples, with reference to the accompanying drawings which are meant to be exemplary and not limiting. For all figures mentioned herein, like numbered elements refer to like elements throughout.

DETAILED DESCRIPTION OF THE PREFERRED EMBODIMENT

Figure 1A:
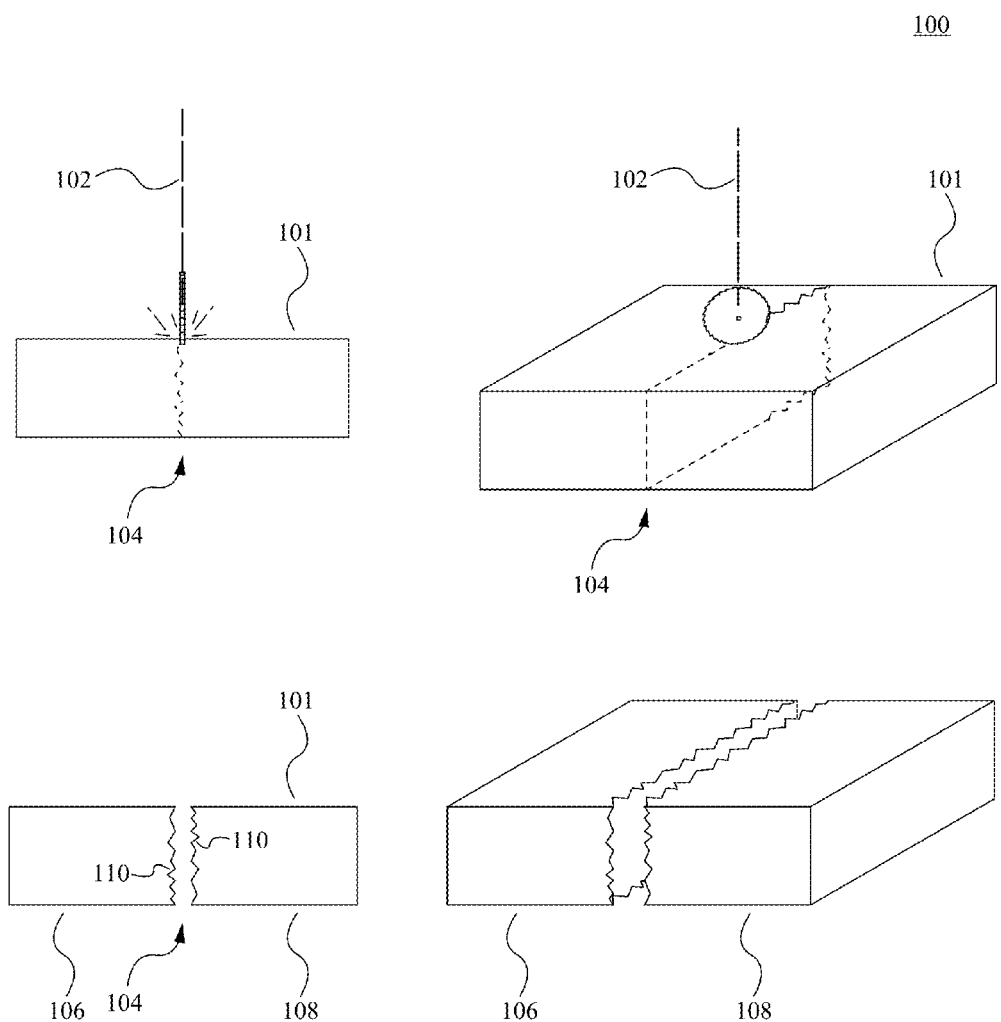
FIG. 1A illustrates a typical method of cutting a stock of brittle material using a typical tool.
Figure 1B:
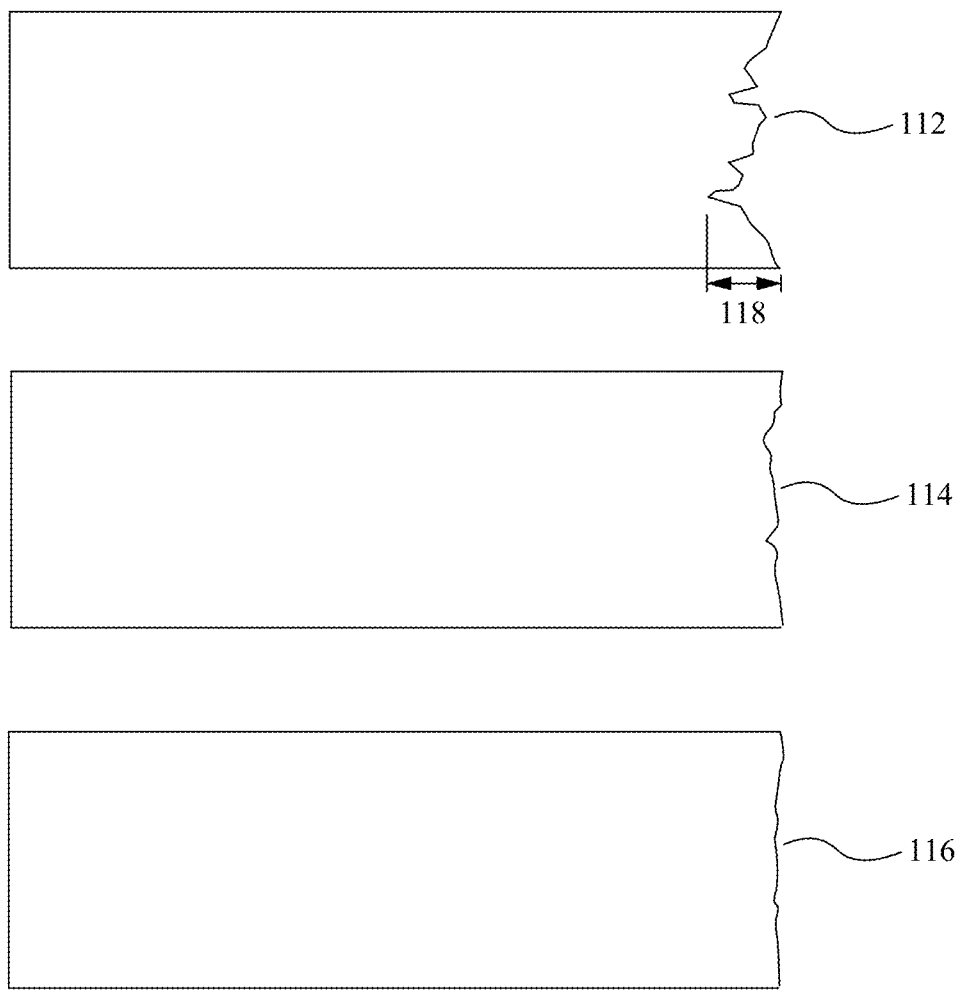
FIG. 1B illustrates three rough edges made by using typical methods of and devices for cutting a brittle material.

Reference is made in detail to the embodiments of the present invention, examples of which are illustrated in the accompanying drawings. While the invention is described in conjunction with the embodiments below, it is understood that they are not intended to limit the invention to these embodiments and examples. On the contrary, the invention is intended to cover alternatives, modifications and equivalents, which can be included within the spirit and scope of the invention as defined by the appended claims. Furthermore, in the following detailed description of the present invention, numerous specific details are set forth in order to more fully illustrate the present invention. However, it is apparent to one of ordinary skill in the prior art having the benefit of this disclosure that the present invention can be practiced without these specific details. In other instances, well-known methods and procedures, components and processes have not been described in detail so as not to unnecessarily obscure aspects of the present invention. It is, of course, appreciated that in the development of any such actual implementation, numerous implementation-specific decisions must be made in order to achieve the developer's specific goals, such as compliance with application and business related constraints, and that these specific goals can vary from one implementation to another and from one developer to another. Moreover, it is appreciated that such a development effort can be complex and time-consuming, but is nevertheless a routine undertaking of engineering for those of ordinary skill in the art having the benefit of this disclosure.

In the following, methods of and devices for shaping brittle materials with a controlled surface and bulk properties are disclosed in accordance with some embodiments of the present invention. The present invention is able to shape brittle materials, such as glass, sapphire or silicon, into precise shapes while controlling the as-shaped surface properties, such as roughness, micro-cracking, taper or bevel, which impact structural and cosmetic characteristics of brittle materials, such as the bending strength and tactile user experience of an electronic display panel.

One of the uses of the present invention is shaping brittle materials with controlled surface quality and within a relatively brief period of time when compared to typical available shaping techniques.

In some embodiments, the present invention enables shaping of brittle materials into predetermined profiles while maintaining a high level of control over the shaped surface properties. Hence, the subsequent conditioning processes are able to be reduced or eliminated from the overall fabrication protocol. The present invention can be utilized to create singulated products with greatly varying options for geometrical configurations. Additionally, the systems and methods disclosed herein can be utilized to fabricate features into products with fine precision. Examples of features include slits, apertures, holes, grooves, notches, etching, and so forth.

In some embodiments of the present invention, the methods are able to substantially reduce the Takt time by reducing or eliminating some or all of the additional steps for making the required profile and/or surface morphology.

In some embodiments of the present invention, the methods and devices are able to prevent uncontrolled crack propagation by pre-defining the crack propagation pathway by modification of the intrinsic brittle material stresses or defects, or by insertion of artificial stresses or defects, which guide the crack propagation. The modification mechanisms can include some or all of changes to the local lattice structure in order to create localized stress planes, discontinuous density of the material, and/or a variation of the energy absorption properties.

In some embodiments of the present invention, the methods and devices are able to prevent uncontrolled crack propagation by applying the shaping tool in a pattern that compensates for the intrinsic granular pathways. The pattern can include localized adjustment of energy delivered from the tool to the brittle material, localized translation of the tool to compensate intrinsic granularity of the brittle material, and/or selective placement of energy from the tool to the brittle material, such as with pulsing a beam of directed energy.

In some embodiments of the present invention, the methods and devices are able to produce as-shaped surface geometric shape and/or surface morphology that satisfy the shape and morphology requirements of a finished product or finished component of a finished product.

In some embodiments, the present invention is applied to shape thin panels of brittle material (e.g., glass or sapphire) for utilization in electronic displays.

In some embodiments, the present invention is used to fabricate a portion of the brittle material having functional surface properties, such as for controlling the optical properties of the surface, the tactile properties of the surface and/or the chemical reactivity of the surface. Creating the functional properties for the as-shaped brittle material surface comprises imparting a periodic structure with periodicity on the scale of nanometers, micrometers, or larger. The periodic structure can be a superposition of multiple substructures, such as combining nanometer scale structures on top of micrometer scale structures.

In some embodiments, the methods of the present invention forms the functional surface properties of a brittle material, which enhance the cosmetic appearance and enhance the structural integrity of the resultant brittle material portion, especially when the brittle material portion is combined with other materials into a finished product, such as a handheld consumer electronic device.

In some embodiments, the present invention changes/manipulates/controls the optical properties of the as-shaped surface. The optical properties include reflecting, transmitting, diffracting, and/or scattering properties of light by the surface. By changing these optical properties, the methods of the present invention can impart a substantially different visual performance of the as-shaped surface. The visual performance of the as-shaped surface can be modified to be brighter or darker, shiny or dull, and/or having a color (hue) change, as compared to the native brittle material surface. The controlled optical properties of the as-shaped surface exhibit different optical response depending on the viewing angle of the surface.

In some embodiments, the present invention controls the tactile properties of the as-shaped surface, including manipulating the coefficients of friction of the surface and/or adding a contour to the surface. By changing these tactile properties, the present invention can impart a surface quality that feels smooth to the human touch, thereby making the as-shaped portion of the brittle material more pleasing to hold in the user's hand and/or carry close to the body, such as in an arm-band mounted holster. The enhanced tactile properties of the as-shaped brittle material portion can be discernable for the portion in mechanical isolation and/or once the portion is assembled with other materials into finished product, such as a handheld consumer electronic device. By changing the tactile properties of the as-cut brittle material surface, the present invention can impart a surface quality that makes the resultant device easier to grip.

The brittle material disclosed herein can include one or more of the following types of materials: glass, sapphire, single crystal or monocrystalline, polycrystalline, ceramic, tungstate, oxide, alloy, hybrid metal/non-metal composite, or a combination of any of these. Further, the brittle material disclosed herein can include a doped, tinted, or color-modified version of the above materials. Furthermore, the brittle material disclosed herein can include a tempered or strengthened glass with an engineered stress profile. The brittle material can comprise Gorilla® or Eagle glass (e.g., Eagle XG®) from Corning®, Dragontrail® from Asahi Glass Co. Ltd, Lotus, Willos, IOX-FS, or Xensation. The brittle material can also include one of these types of glass that is shaped with the method of the present invention prior to the tempering or strengthening process step. The tempering or strengthening process step can comprise heating the glass or subjecting the glass to an ion exchange treatment. The brittle material can be one of these types of glass that is shaped with one of the methods of the present invention subsequent to the tempering or strengthening process step.

The brittle material described in the present specification can comprise a layered material. The one or more layers of such brittle material can exhibit different mechanical or chemical properties that distinguish the layered regions from one to another. In some embodiments, the different mechanical or chemical properties of the layered regions can be created or enabled by a brittle material strengthening process. For example, the layered brittle material can comprise a glass that has undergone an ion exchange treatment. The ion exchange process imparts layers of different compressive stress or tensile stress.

In some embodiments, the brittle material described herein comprises a layered material created by stacking two or more brittle materials, or by stacking a brittle material with one or more brittle, plastic (polymer) or metallic materials. This type of brittle material is used in electronic display subassemblies, where the layers can serve different functions in display operation. For example, the brittle material can comprise a material stack that includes one or more of an active layer, a filter layer, and a cover layer. One or more of these layers can be transparent to visible light.

Moreover, the present invention is able to cut brittle materials that have inclusions, stress planes, discontinuities, or other intrinsic properties that are unable to be shaped by a typical methods and devices (e.g., diamond saw). The present invention has many advantageous features over typical shaping processes. The surface of the brittle material that is shaped using the present invention has smoother as-shaped surface compared with the surface that is shaped using typical methods, which can be quantified and measured by measuring the size of surface micro-cracks, spallation, and/or chips. The brittle material that is shaped using the embodiments of the present invention has stronger bending strength when compared with the brittle material that is shaped using a typical method.

In some embodiments, the present invention is used to fabricate portions of brittle materials to be integrated into consumer electronic devices, such as smart phones, tablet computers, personal digital assistants, laptop or notebook computers, touch-screens, desktop computer monitors, television sets, portable music players, computer mouse, touch-sensitive motion controllers, and protective covers for any of these electronic devices. In some embodiments, the portions of brittle materials to be integrated into consumer electronic devices include display screens, touch screens, multi-touch screens, display back planes, display illumination layers, light emitting diode (LED) substrates, organic light emitting diode (OLED) substrates, and/or transparent conducting layers. The layers can comprise either an active or passive matrix format.

In some embodiments, the present invention is used to fabricate portions of brittle materials into cut-outs, substrates from which additional portions will be shaped, cut-outs with feature portions removed from within the cut-out perimeter, and/or cut-outs having multiple macroscopic functions enabled within the brittle material common plane. In some embodiments, the additional shaping of the portions comprises creating an edge chamfer to improve the functional performance of the brittle material component. The feature portions and enabled functions can comprise visual displays, acoustic transfer channels, photographic recording portals, sound recording portals, mechanical buttons, mechanical switches, ambient light sensors, photographic flash emitters, antennas, electronic connectors, fiber optic connectors, touch screen buttons, touch screen switches, mechanical clips, corporate logo markings, cosmetic designs, fluid transfer channels, radio frequency wave or microwave transmission channels, and/or thermal transducers.

In some embodiments, the present invention is used to shape brittle materials with a thickness (the dimension is defined by a plane substantially parallel to the direction of tool path or pattern) <500 micrometers while controlling the as-shaped edge properties. Shaping thin sheets of brittle materials into separate portions is generally very difficult since typical methods impose collateral damage in the form of large cracks, spallation, chips or internal faults. In some embodiments, the present invention is used to shape brittle materials with thickness <300 micrometers while controlling the as-shaped surface properties.

In some embodiments, the system of present invention includes a shaping tool, tool delivery components, shaping method software, computer-readable instructions, or templates stored/retained in the machine memory, brittle material handling devices, electronics to control system functionality and/or monitor system performance, software to control system functionality, monitor system performance and/or provide telemetry of system operations, and/or system performance validation metrology.

In some embodiments, the system of present invention includes the tool(s) that enable separating a portion of a brittle material from a first larger portion of the material, removing smaller sections of brittle material from within the perimeter of the smaller portion, and modifying the edges to create chamfer, beveling, rounding or squaring of the as-shaped edge.

In some embodiments, the as-shaped surface quality of the brittle material using the methods and devices of the present invention has the following features: (1) the size of the micro-cracks on the as-shaped edge is smaller than about 15 micrometers or penetrates less than about 15 micrometers into the bulk of the material; (2) the sizes of the chips, spall or burrs on the as-shaped surface are smaller than 20 micrometers or penetrate less than about 20 micrometers into the bulk of the material; (3) the surface of the as-shaped surface is smooth to the touch of a human finger; (4) the as-shaped surface has as shaped surface edge root-mean-square (RMS) roughness less than about 15 micrometers; (5) the as-shaped surface has roughness designed to minimize light loss due to scattering; (6) the as-shaped surface has shapes of beveled, or chamfered, sidewalls; (7) the as-shaped surface has tapered sidewalls; (8) the as-shaped surface enables the as-shaped portion to sustain bend strength of greater than about 60 megapascal (MPa) after shaping, as measured using a three-point, or four-point, flexural strength test; (9) the brittle material with the as-shaped surface enables the shaped portion to sustain bend strength of greater than about 400 MPa after shaping and post-shaping strengthening, as measured by a three-point, or four-point, flexural strength test; and (10) the brittle material with the as-shaped surface exhibits a polarized light-measured stress field less than about 50 micrometers deep into the material. The properties are listed as exemplary features. A person of ordinary skill in the art appreciates that other features are within the scope of the present invention.

The system of the present invention can implement a shaping pattern with an arbitrary tool path, e.g. with curves, straight-lines, sharp corners, oblique corners or independent arbitrary cut-out features. The shaping pattern can be continuous or discontinuous when tracing the arbitrary tool path. The shaping pattern can traverse a tool path inside or outside the perimeter of a previous tool path. The shaping pattern(s) can be programmable via software or external machined commands. The tool path and/or pattern can be enabled by a coordinated combination of scanning the tool and translating the brittle material substrate.

In some embodiments, the present invention uses a tool comprising selectively variable output from a femtosecond laser source as part of the shaping process. In some embodiments, the present invention uses a tool comprising burst mode output from a femtosecond laser, where the individual femtosecond laser pulses are grouped into short bursts lasting 10 to 1000 nanoseconds and the time interval between individual pulses is about 1 to 100 nanoseconds. In some embodiments, the present invention uses shaped bursts of femtosecond laser pulses in a burst mode format, where the amplitude of each individual pulse within the overall burst has a unique value. In some embodiments, the present invention uses temporally shaped pulses on the femtosecond to picosecond time scale. In some embodiments, the present invention uses tools comprising a dual light source (e.g., a femtosecond laser and a longer pulse or a continuous wave (CW laser)). In some embodiments, the present invention uses tools comprising a femtosecond laser and an acoustic transducer.

In some embodiments, the method of the present invention comprises providing a stock of brittle material to be shaped, directing a first source of energy to the brittle material along a programmed tool path in order to impart a microscopic defect zone, and directing a second source of energy to the brittle material, following a substantially identical tool path as the first source of energy, or at least a portion of that path, in order to cause a controlled separation of the original portion of brittle material into two new portions of brittle material, where the as-shaped surface quality of the one or more new portions has predetermined and highly controllable geometric shape and/or surface morphology.

In the following description, devices for and methods of shaping brittle materials with controlled surface and bulk properties are disclosed in further detail in accordance with some embodiments of the present invention.

Figure 2:
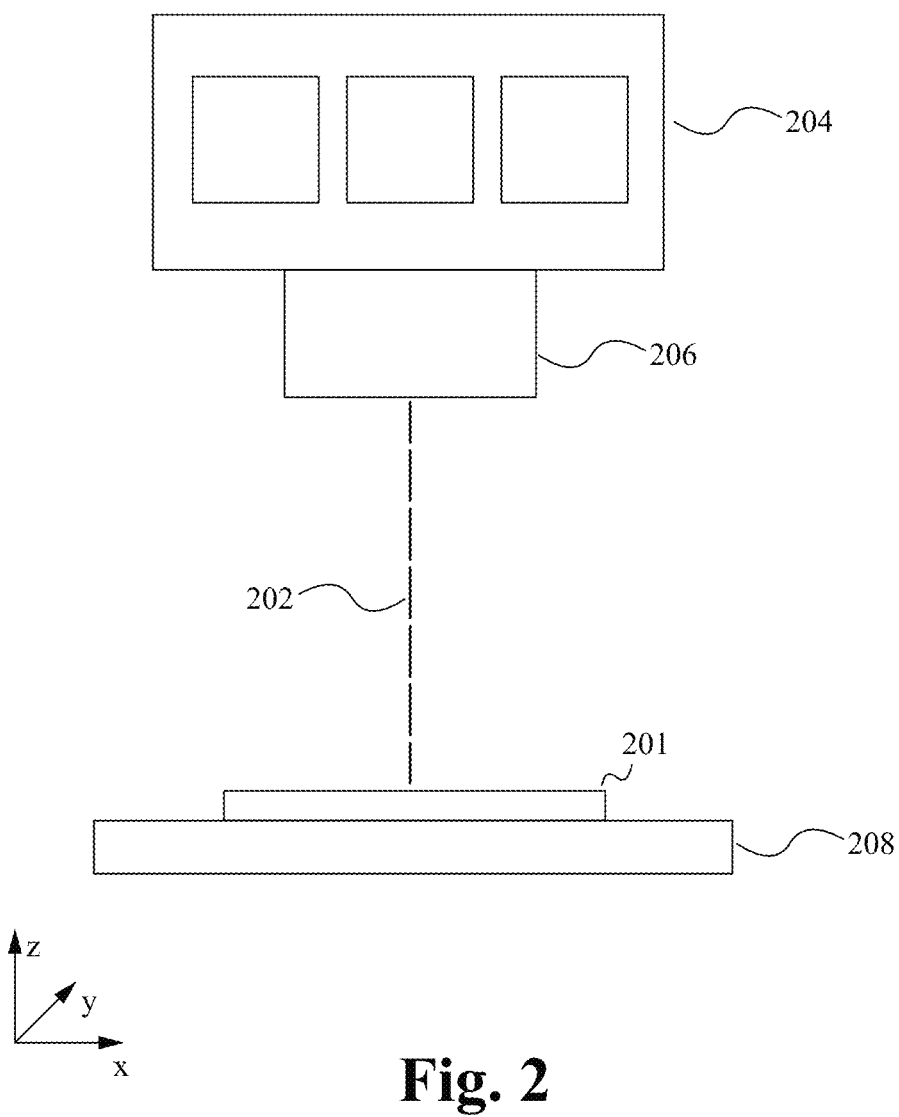
FIG. 2 illustrates an apparatus for applying a tool to a brittle material substrate in accordance with some embodiments of the present invention.

FIG. 2 illustrates an apparatus 200 for applying a tool 202 to a brittle material substrate 201 in accordance with some embodiments of the present invention. The tool is generated by a source 204 and directed to the substrate 201 by a delivery module 206. The substrate is positioned by a fixture 208.

Figure 3:
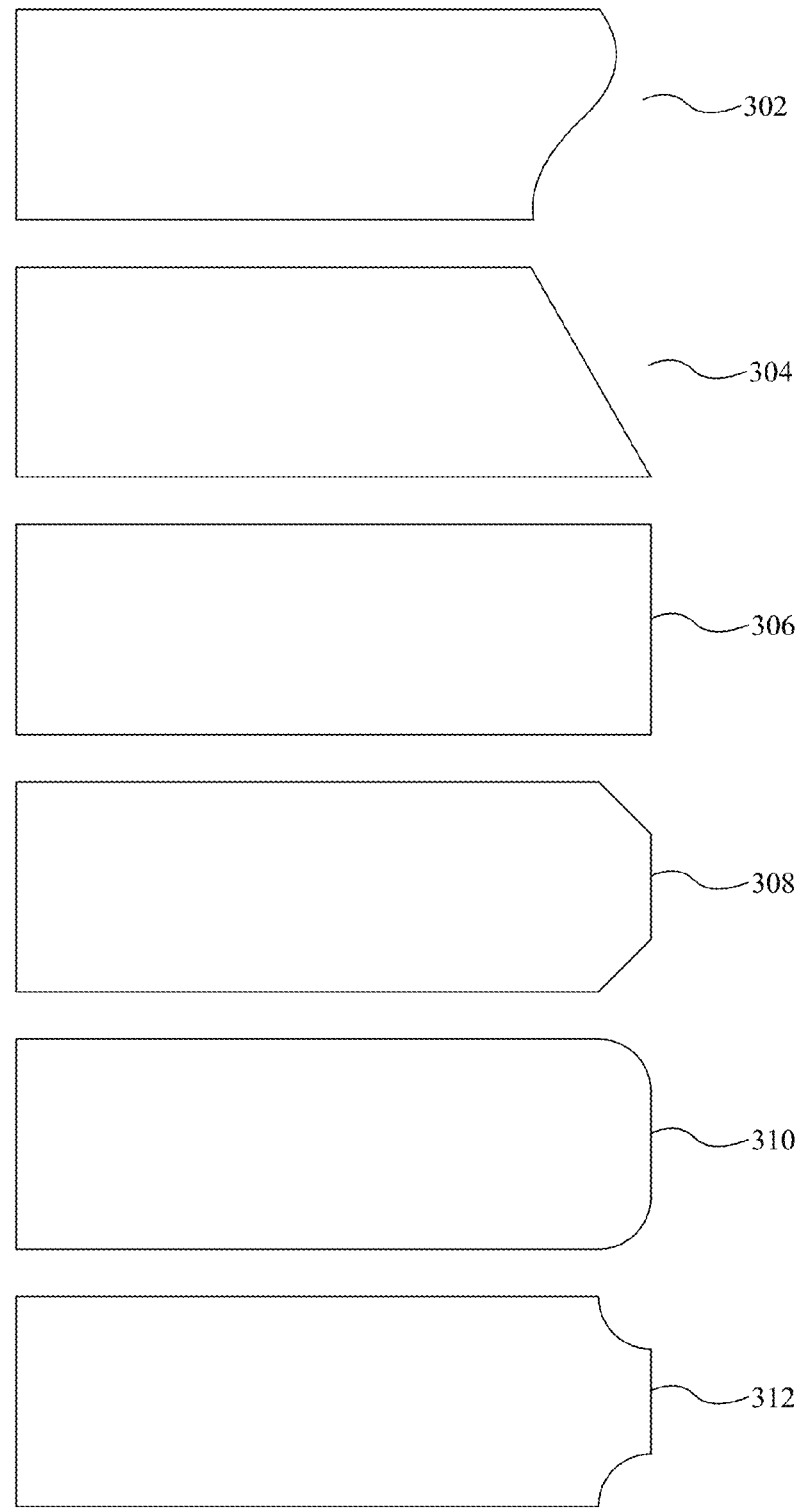
FIG. 3 illustrates a profile view of six edge geometric shapes that are created by applying the tool to a brittle material substrate in accordance with some embodiments of the present invention.

FIG. 3 illustrates a profile view of edge geometric shapes that are formed by applying the tool 202 to a brittle material substrate 201 in accordance with some embodiments of the present invention. The shape 302 is an arbitrary curved contour with inflection points. The shape 304 is a uniform taper with an exemplary precise taper angle. The shape 306 is a zero-taper edge. The zero-taper edge is perpendicular to the brittle material 201 top and/or bottom edges. A person of ordinary skill in the art appreciates that any other shapes are able to be formed using the methods and devices of the present invention, such as rounded curve and triangle with a sharp edge. More shapes are able to be made using the methods and device disclosed herein. For example, the shape 308 is a chamfered edge with a precise chamfer angle and depth. The shape 310 is a round convex chamfered edge with precise radius of curvature. The shape 312 is a round concave chamfered edge with precise radius of curvature.

Figure 4:
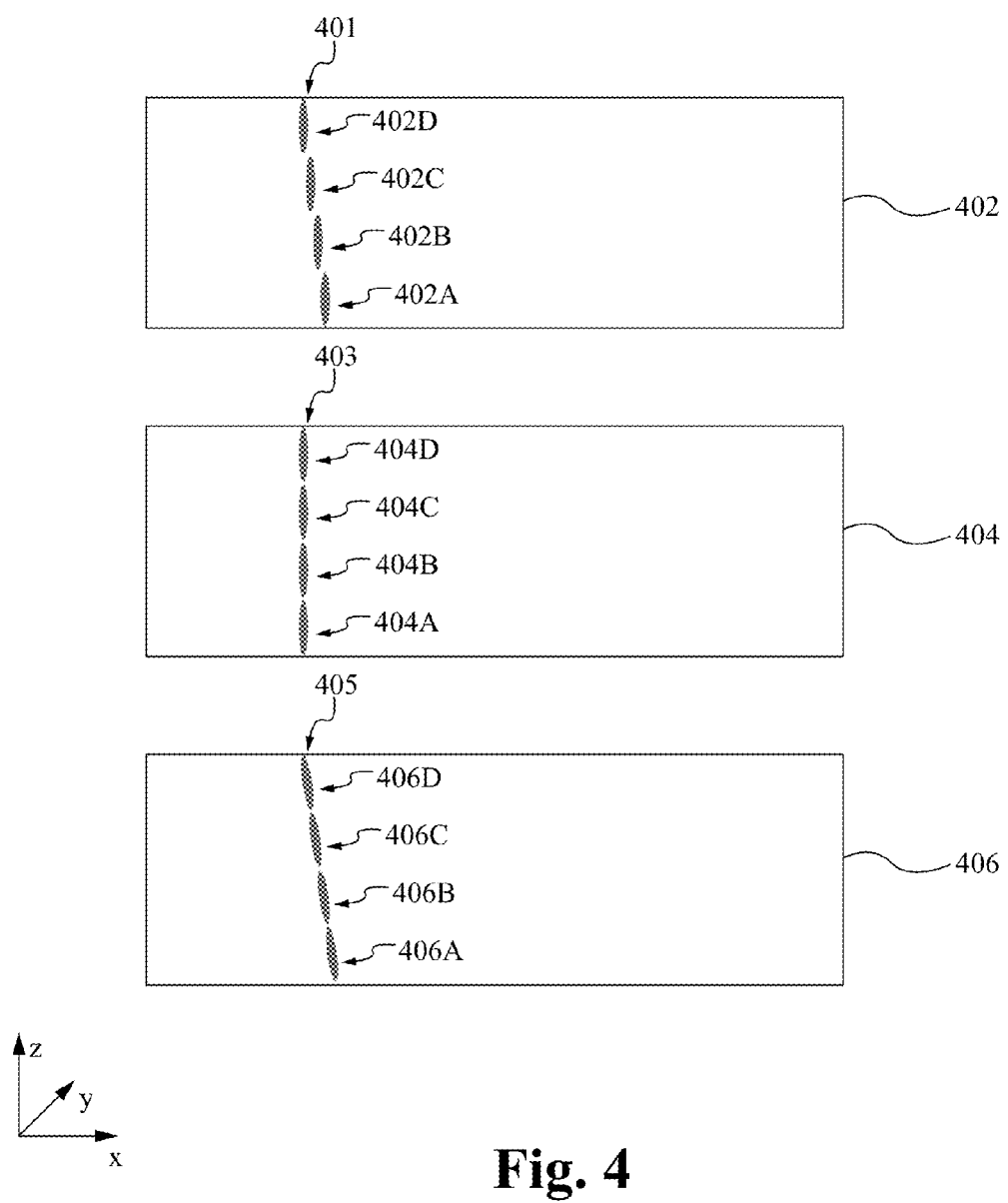
FIG. 4 illustrates a cross sectional view of void patterns on the brittle material made by the methods and devices in accordance with some embodiments of the present invention.

FIG. 4 illustrates a cross sectional side view of void patterns on the brittle material made by the methods and devices in accordance with some embodiments of the present invention. In some embodiments, a first source of energy, such as a femtosecond pulse laser beam, ablates a series of void patterns 401, 403, and 405. In the first brittle material 402, the void pattern has the defect zones 401 with individual voids 402A, 402B, 402C, and 402D that are stacked vertically with stair-step lateral offset from one void to the next. In some embodiments, a first femtosecond pulse laser beam ablates the brittle material near the bottom side of the brittle material and making a void 402A. Next, a second femtosecond pulse laser beam ablates the brittle material and makes a void 402B. A third and fourth femtosecond pulse laser beams ablate the brittle material and makes voids 402C and 402D. The voids 402A to 402D are able to be created in any orders. For example, a first femtosecond pulse laser beam creates void 402D. A second femtosecond pulse laser beam creates void 402C. A third femtosecond pulse laser beam creates void 402B. Similarly in some other embodiments, a first femtosecond pulse laser beam creates the void 402B and a second femtosecond pulse laser beam creates the void 402D.

In the second brittle material 404, the void pattern has the defect zones 403, which has individual voids 404A-404D that are stacked vertically with no lateral offset from one void to the next. In the third brittle material 406, the void pattern contains the defect zones 405, which has individual voids 406A-406D that are stacked diagonally with no lateral offset from one void to the next with respect to the oblique diagonal. In some embodiments, some portions of the voids are overlapping from one void to the next. A person of ordinary skill in the art appreciates that the voids are able to be created in any angles, any sequences, any shapes and any patterns.

Exemplary methods of and devices for shaping brittle materials are disclosed in accordance with some embodiments of the present invention.

In some embodiments, a method of shaping a brittle material comprises providing a stock of brittle material to be shaped, directing a first laser beam to the brittle material along a programmed tool path in order to impart a microscopic defect zone, directing a second laser beam to the brittle material following a substantially identical or identical tool path of the first laser beam, and causing a controlled separation of the original portion of brittle material into two new portions of brittle material. In some embodiments, the second laser beam generates void pattern overlapping at least a portion of the void pattern generated by the first last beam. Using the method of the present invention, the as-shaped surface quality of the one or more new portions has predetermined geometric shape and/or surface morphology.

In some embodiments, a method of shaping a brittle material comprises providing a stock of brittle material to be shaped, directing a first femtosecond pulse laser beam to the brittle material along a programmed tool path in order to impart a microscopic defect zone, directing a second long pulse or CW laser beam (a continuous wave laser beam) to the brittle material following a substantially identical tool path as the first laser beam or at least a portion of that path, and causing a controlled separation of the brittle material into two new portions of brittle material. The as-shaped surface quality of the one or more new portions has predetermined controllable geometric shape and/or surface morphology.

The tool path followed by the first laser beam in this exemplary embodiment includes a pattern that traces the outline of the desired as-shaped device along with well-defined stress relief pathways, or lines. The stress relief lines are positioned using the first laser beam at predetermined locations adjacent to the device outline portion of the pattern to facilitate the propagation of a separation line along the device outline. These stress relief lines are particularly useful when propagating a separation line around a small radius feature, such as the corner of a display panel, where the intrinsic stress of the brittle material substrate tends to create uncontrolled pathways for material separation.

Figure 5:
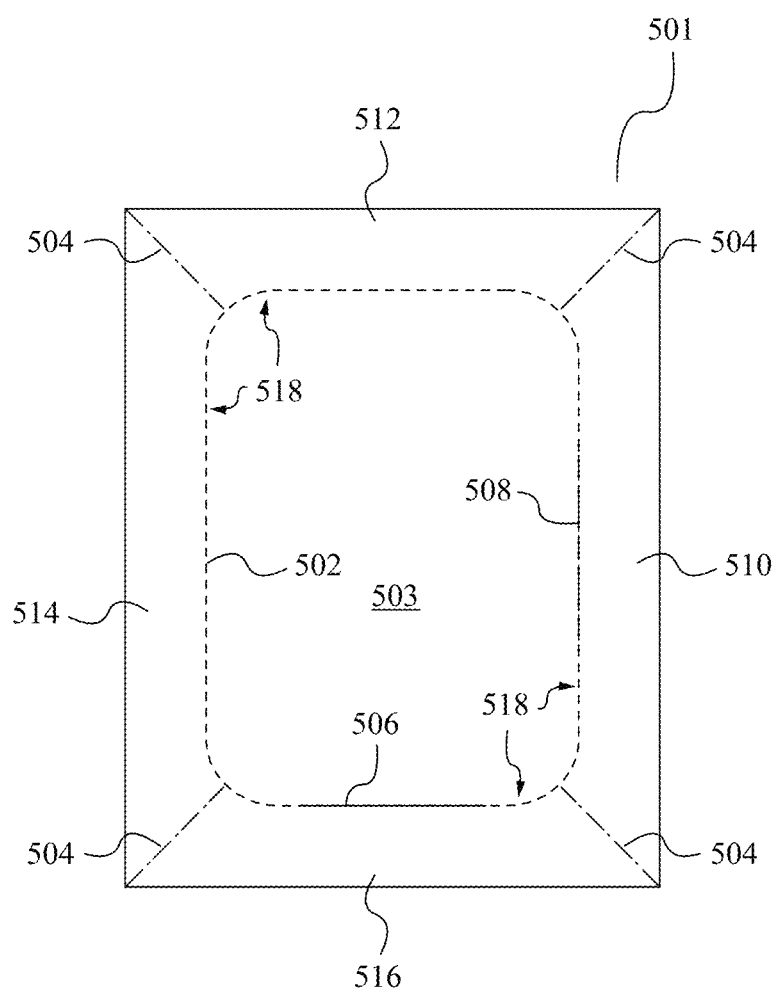
FIG. 5 illustrates a top-down view of a tool path pattern that includes stress relief lines in accordance with some embodiments of the present invention.

FIG. 5 illustrates a top-down view of a tool path pattern 502 that includes stress relief lines 504 in accordance with some embodiments of the present invention. The brittle material 501 is first exposed to the first laser beam that first follows the device outline tool path 502, then follows the stress relief tool path 504. In some embodiments, the tool path 502 is a continuous line 506. In alternative embodiments, the tool path 502 constitutes spatially cut points/ voids 508 remote from each other.

In some embodiments after the first laser beam has traced out the full pattern to define the preferred stress fracture pathways 504, the brittle material 501 is then exposed to the second laser beam that follows the device outline tool path 502. Under exposure to the second laser beam, the brittle material 501 separates into at least five new portions comprising the new brittle material device portion 503 along with four sacrificial portions 510, 512, 514, and 516. The as-shaped surface quality of the device portion 503 has predetermined and highly controllable geometric shape and/ or surface morphology.

Figure 6:
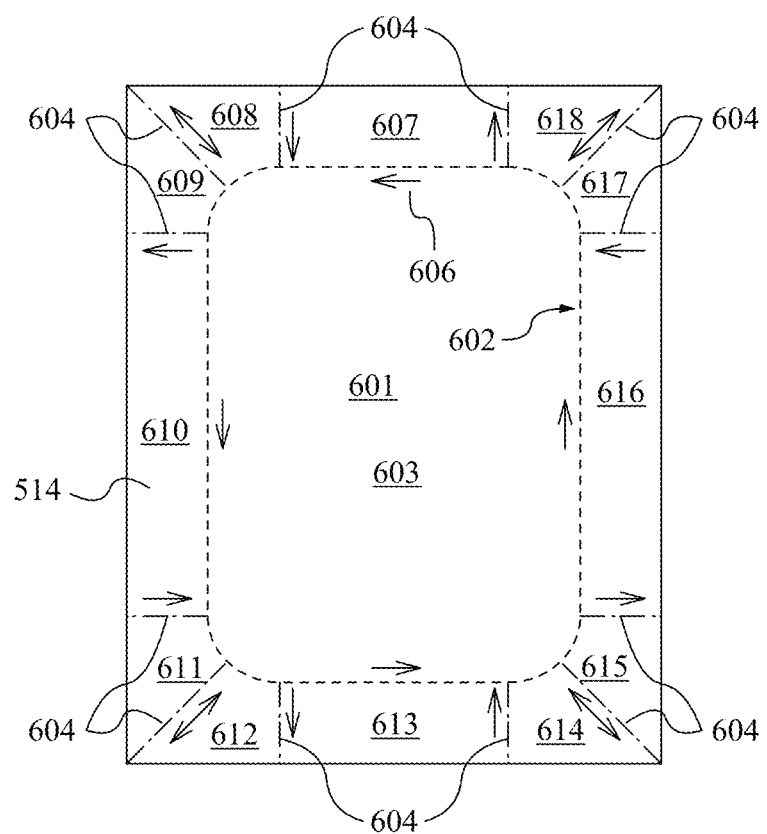
FIG. 6 illustrates a top-down view of another tool path pattern that includes stress relief lines in accordance with some embodiments of the present invention.

FIG. 6 illustrates a top-down view of another tool path pattern 602 that includes stress relief lines 604 in accordance with some embodiments of the present invention. A first laser beam, such as a femtosecond pulse laser beam, is applied on a brittle material 601 following a device outline tool path pattern 602 in a direction indicated by the arrow 606. Next, the first laser beam is applied to the stress relief lines 604. The arrows 606 show the directionality of the first laser beam tool path. Next, a second laser beam, such as a second long pulse (e.g., a picosecond laser beam) or CW laser beam, is applied on the brittle material 601 following only the device outline of the tool path 602. After the application of the second laser beam, the brittle material 601 separates into multiple new portions comprising the new brittle material device portion 603 along with multiple sacrificial portions 607-617, where the as-shaped edge quality of the device portion 603 has predetermined and highly controllable geometric shape and/or surface morphology.

In some embodiments, the method includes removing a portion of the brittle material from within/surrounded by a larger portion of the brittle material. The tool path followed by the first laser beam comprises a pattern that traces the outline of the interior portion to be removed from a larger portion of brittle material along with well-defined stress relief pathways or lines. The stress relief lines are positioned using the first laser beam at a predetermined locations adjacent to, and/or interior to, the outline portion of the pattern to facilitate the propagation of a separation line along the outline. These stress relief lines are useful when propagating a separation line inside a small radius feature, such as the interior corner of a display panel feature, where the intrinsic stress of the brittle material substrate tends to create uncontrolled pathways for material separation.

Figure 7:
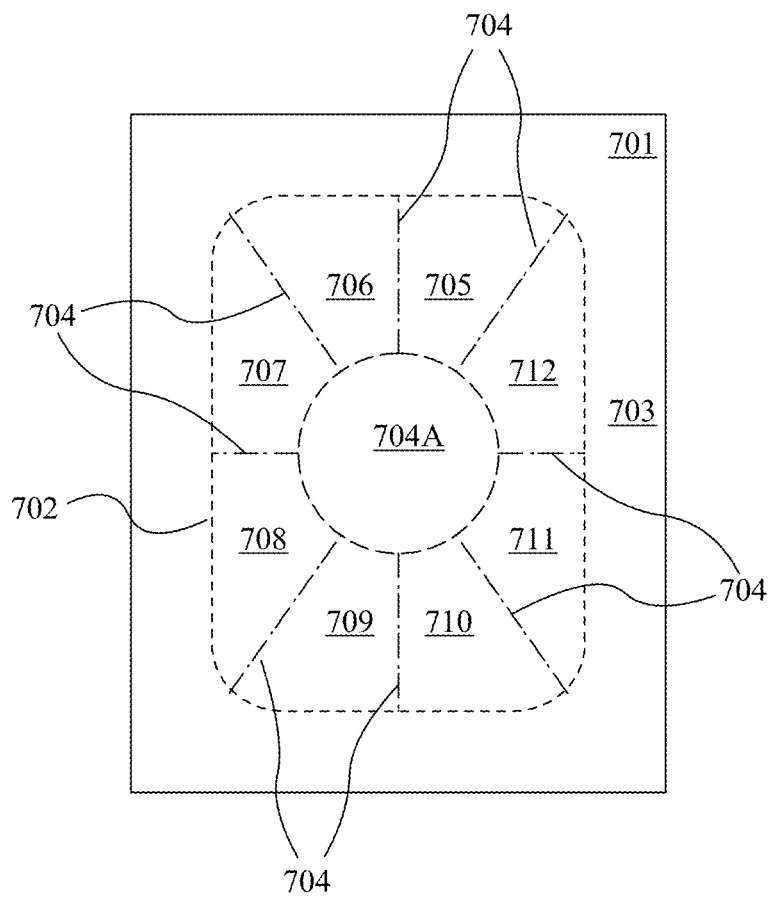
FIG. 7 illustrates a top-down view of a tool path pattern in accordance with some embodiments of the present invention.

FIG. 7 illustrates a top-down view of a tool path pattern in accordance with some embodiments of the present invention. The tool path pattern includes stress relief lines 704 and 704A interior to the outline portion 702 of the pattern. The brittle material 701 is first exposed to the first laser beam that first follows the outline tool path 702, then follows the stress relief tool path 704 and 704A. These tool paths can be continuous, or they can be spatially remote from each other. After the first laser beam traced out the full pattern to define the predetermined stress fracture pathways, the brittle material 701 is then exposed to the second laser beam that preferably follows only the device outline tool path 702. After the application of the second laser beam, the brittle material 701 is separated into multiple new portions comprising the new brittle material device portion 703 along with sacrificial portions 705-711 (including 704A), where the as-shaped edge quality of the device portion 703 has predetermined and highly controllable geometric shape and/ or surface morphology.

In some embodiments, applying the first laser beam to the outline tool path 702 and the stress relief tool path 704 is preceded by creation of a "pilot hole" 704A inside the interior of the outline 702 and stress relief lines 704, to facilitate a cleaner separation of the sacrificial portions of brittle material from the larger portion of brittle material. A person of ordinary skill in the art appreciates that the patterns 703, 704A, 705-712 can be formed in any order.

In some embodiments, the first and/or second laser beams are focused to a predetermined plane within the brittle material substrate or on the surface of the brittle material in order to selectively expose that plane of the brittle material. The selective exposure can be achieved by using a high-numerical-aperture (high-NA) lens to form a rapidly converging beam. In some embodiments, the numerical aperture (NA) of the lens is greater than 0.1. In other embodiments, the numerical aperture (NA) of the lens is greater than 0.3. In some other embodiments, the numerical aperture (NA) of the lens may be greater than 0.5. In some embodiments, the numerical aperture (NA) of the lens may be greater than 0.7.

In some embodiments, the first and/or second laser beams are shaped by one or more beam shaping optical elements to provide a predetermined laser beam wave front at a specific plane of exposure within the brittle material substrate, or on the surface of the brittle material. For example, the first laser beam wave front can be optimized to provide an extended profile stress defect inside the brittle material. This can be achieved by adding a transparent plate between the high-NA lens and the brittle material substrate to deliberately impose spherical aberration into the laser beam path. This form of beam shaping enables a longer effective depth of focus, thereby creating a stress defect with an extended longitudinal dimension.

In some embodiments, the tool path followed by the first laser beam is repeated two or more times, with a change in focal plane for each iteration of the tool path. The change in focal plane with each iteration can be utilized to form a stacked array of voids, such as those shown in FIG. 4 as mentioned above. Each void layer in the vertical stack is formed within one focal plane. Each focal plane can contain a large number of individual voids placed side-by-side to follow the pattern defined as the brittle material portion outline 702, stress relief lines 704, or pilot hole 704 of FIG. 7. In some embodiments, each focal plane iteration of the tool path is able to be laterally shifted, by a microscopic amount, such that a stair-case defect zone 401 of FIG. 4 is able to be formed. In other embodiments, each focal plane iteration of the tool path is able to have zero lateral shift, such that an inline vertical defect zone 403 of FIG. 4 is able to be formed. In some other embodiments, each focal plane iteration of the tool path can be offset, but following along a diagonal plane, such that a tilted inline defect zone 405 of FIG. 4 is able to be formed.

In some embodiments, the change in focal plane is provided by an active spatial beam phase filter for the laser beam. The phase filter comprises a two-dimensional (2D) liquid crystal spatial light modulator or a 2D deformable mirror assembly. The phase filter is programmable via computer control in order to adjust the focal plane with minimal delay between iterations of traversing the repeated tool path in the brittle material.

The active spatial beam phase filter is able to be programmed to impart a spatial phase to the laser beam that is not purely quadratic. Instead, the phase filter is able to be programmed to mimic the high-NA-lens-plus-transparent-plate wave front optimization scheme, or an alternative wave front optimization scheme that extends the longitudinal dimension of the resultant stress defect. The optimization scheme can be adaptive to self-correct the imposed spatial filter function based on the feedbacks from a laser material process monitoring sensor.

In some embodiments, the methods include removing a portion of the as-shaped brittle material within a larger portion of the as-shaped brittle material. This method comprises adjusting the temperatures of the as-shaped portions of brittle material in order to create a temperature discontinuity between the two portions. In some embodiments, an inner portion of brittle material is cooled, or chilled, to induce thermal material contraction, while the outer material is held at constant temperature, or even heated. The material contraction of the inner portion of brittle material can result in clean separation of the inner and outer portions, so that the separation can occur with minimal resistance from friction, or other surface forces, between the two portions.

Figure 8A:
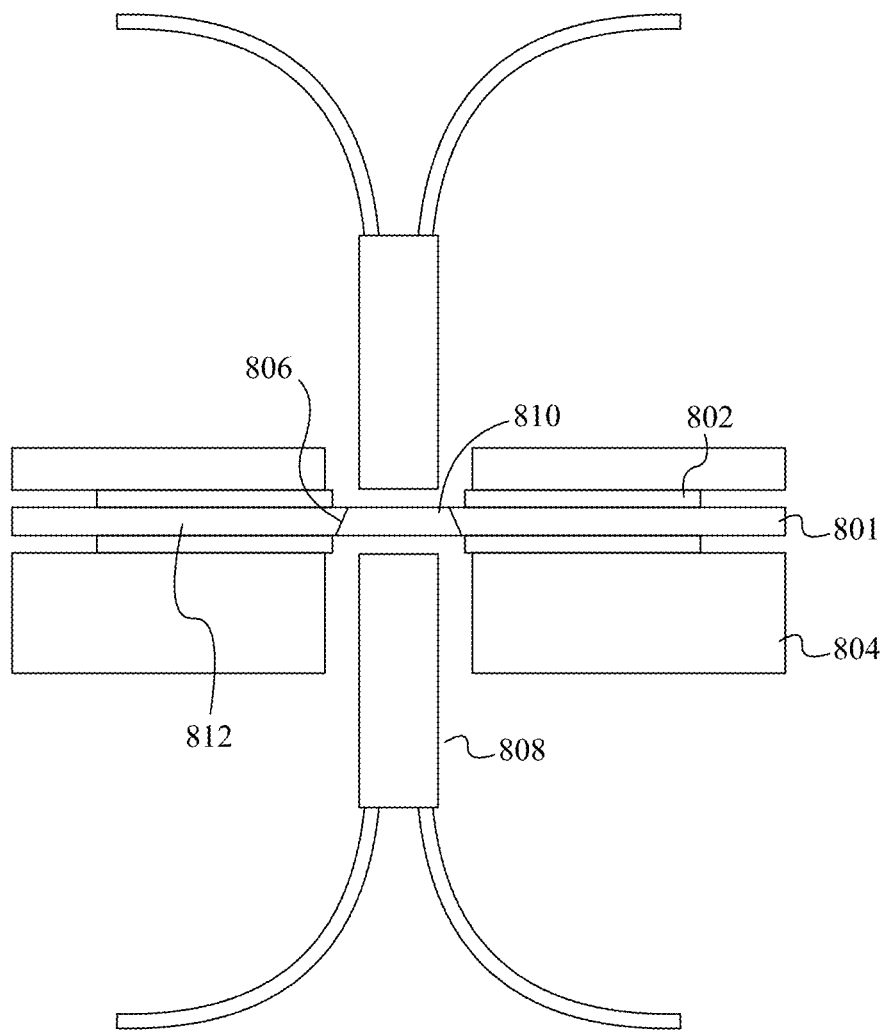
FIG. 8A illustrates a temperature discontinuity separation fixture in accordance with some embodiments of the present invention.

FIG. 8A illustrates a temperature discontinuity separation fixture 800 in accordance with some embodiments of the present invention. The outer portion of the as-shaped brittle material 801 is heated, or held at ambient temperature, by heaters 802 held against the brittle material 801 with clamps 804. The inner portion 810 of brittle material 801, which is inside the portion-dividing pattern 806, is rapidly cooled by a cooling tool 808, such as a copper post that is chilled by liquid nitrogen. The rapid cooling of the inner portion 810 causes a mechanical contraction of the inner brittle material portion 810, whereby the inner brittle material portion 810 separates cleanly from the outer portion 812 of brittle material with minimal resistance from friction, or other surface forces, between the two portions.

Figure 8B:
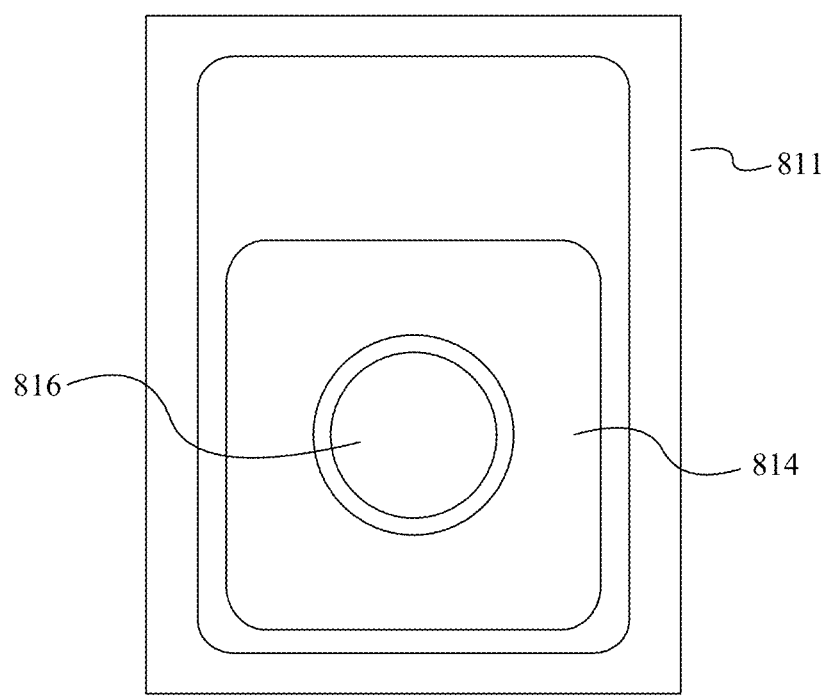
FIG. 8B illustrates the resultant temperature pattern in a brittle material substrate during application of the temperature discontinuity separation fixture in accordance with some embodiments of the present invention.

FIG. 8B illustrates the resultant temperature pattern in a brittle material substrate 811 during application of the temperature discontinuity separation fixture 800 of FIG. 8A in accordance with some embodiments of the present invention. The outer portion of the temperature pattern 814 is held at ambient temperature. In some other embodiments, the temperature pattern 814 is heated above an ambient temperature. The inner portion of the temperature pattern 816 is cooled substantially below the temperature of the outer portion in order to induce separation of the two portions by way of mechanical/physical contraction of the inner portion 816.

In some embodiments, the temperature discontinuity separation step can be executed after the brittle material substrate 811 is exposed to a single laser beam that creates stress defects within the brittle material. The stress defects created by the laser beam provide a pathway for releasing the stress imposed by the temperature discontinuity. This arrangement enables the simultaneous division of a brittle material substrate into two or more portions of brittle material and the separation of the portions while avoiding resistance from friction, or other surface forces, between the resultant portions.

In some embodiments, the temperature discontinuity separation step is executed after the brittle material substrate is exposed to a first femtosecond laser beam that creates stress defects within the brittle material and a second continuous wave, or longer pulse, laser beam that divides the original brittle material substrate 811 into two or more new portions of brittle material. In some embodiments, the division into two or more distinct new portions of brittle material, due to the second laser exposure, does not include the separation of the portions from each other, because of the strong friction, or other surface forces, among the new portions. In these embodiments, the temperature discontinuity separation step is able to be executed after exposure of the brittle material substrate to the second laser beam in order to separate the new portions of brittle material from each other.

In some embodiments, the method comprises providing a stock of a brittle material to be shaped, directing a first source of energy tool to the brittle material along a programmed tool to impart a microscopic defect zone, directing a second source of energy tool to the brittle material, following a partially identical tool path as the first source of energy tool to cause a controlled separation of the original portion of brittle material into multiple new portions of brittle material, and directing a third source of energy tool to at least one edge of one of the separated portions to further modify the edge geometry and/or surface morphology, where the as-shaped surface quality of the one or more new portions has predetermined and controllable geometric shape and/or surface morphology.

In some embodiments, the third source of energy tool is used to form a chamfer along the perimeter(s) of one of the new portions of brittle material. The perimeter of the brittle material comprises either, or both, an interior or exterior perimeter of the shaped pattern. The chamfer geometry imparted to the perimeter(s) of the brittle material portion can further improve the functional characteristics of the new portion of brittle material, such as the bending strength of the brittle material portion as evaluated using a multi-point flexural strength test. The chamfer or bevel profile can be angular or smoothly rounded.

In some embodiments, the first, second and/or third source of energy tools comprise femtosecond pulse laser beams. In some embodiments, the first, second and/or third source of energy tools comprise picosecond pulse laser beams. In some embodiments, the first, second and/or third source of energy tools comprise nanosecond pulse laser beams. In some embodiments, the first, second and/or third source of energy tools comprise continuous wave (CW) laser beams, such as from a carbon dioxide ($CO_2$) laser source.

In some embodiments, the third source of energy tool application to the brittle material is preceded by bonding a sacrificial substrate to a portion of the perimeter(s) edge in order to enhance the localized mechanical stress of a portion of the perimeter(s) edge.

In some embodiments, the third source of energy tool application to the brittle material is followed by a thermal shock step to create the desired/predetermined perimeter edge profile, such as the chamfer profile. The thermal shock step can comprise placement of the brittle material, or a perimeter section of the brittle material, in a bath of hot fluid. The hot fluid bath can impart functional features to the brittle material portion, such as an increased bending strength, as a result of an ion-exchange process between the brittle material and the fluid.

In some embodiments, the third source of energy tool is used to create a temporary, thin melt zone along the perimeter(s) of one of the new portions of brittle material. The perimeter of the brittle material comprises either, or both, an interior or exterior perimeter of the shaped pattern. The thin melt zone is temporary and is followed immediately by a re-solidification. The sequence of melt-and-solidify results in a self-healing effect in the brittle material whereby micro-cracks and/or other defects are filled-in or otherwise erased from the perimeter of the material. The self-healing effect imparted to the perimeter(s) of the brittle material portion improves the functional characteristics of the new portion of brittle material, such as the bending strength of the brittle material portion, which is verified by using a multi-point flexural strength test.

In some embodiments, the thin melt zone creation step is induced by a heat source, such as a torch, a laser, a specifically shaped resistive heating element, or a pair of arc electrodes. The heat source is utilized to heat a thin layer of the perimeter of the brittle material to right above the melt temperature of the brittle material, such as 0.1° C. The application of the heat source is precisely controlled so as to only melt a very thin region nearest the edge of the brittle material. This heat treatment can induce a reflow of molten brittle material to fill-in any discrete defects in the edge profile to create a substantially smoother profile. The macroscopic properties of a brittle material, such as flexural bending strength, can be related to the brittle material edge quality, in terms of geometry and/or surface roughness. Hence, the reflow of the brittle material produced by the application of a heat source can substantially improve the macroscopic performance of the brittle material portion.

In some embodiments, the temperature of the brittle material is entirely raised to a temperature near the softening temperature, or to the melting temperature, intrinsic to the brittle material before, during, and/or after the application of a heat source for improving the edge profile. By elevating the temperature of the entire brittle material near the softening temperature and then applying the heat treatment to the edge of the brittle material portion, the process avoids thermal shock around the perimeter of the brittle material, which can cause deleterious side effects.

In some embodiments, a heat source is applied to the perimeter of the as-shaped brittle material in order to remove a thin strip of the brittle material, thereby removing a sharp edge and creating a chamfer-like geometry. This effect can be manifested as an evaporation of the brittle material comprising the sharp edge, or as a pealing of the thin strip of brittle material away from the brittle portion, by way of localized thermal stress, that is intended to be transferred onto further usage. Removal of the sharp edge in this embodiment has the macroscopic effect of improving the performance of the brittle material portion in terms of transmitting light, creating optical images, and mechanically strengthening the brittle material portion. The device that integrates the brittle material portion with the treatments described above can improve the cosmetic nature of the brittle material.

In some embodiments, the thin strip removal step is induced by a heat source, such as a torch, a laser, a specifically shaped resistive heating element, or a pair of arc electrodes. The heat source is utilized to remove a thin layer of the perimeter of the brittle material to be just above the melt temperature of the brittle material, such as 0.1° C. The application of the heat source is precisely controlled so as to only strip away a very thin region nearest the edge of the brittle material. The macroscopic properties of a brittle material, such as flexural bending strength, are directly related to the brittle material edge quality, in terms of geometry and/or surface roughness. Hence, the removal of a thin strip from the brittle material produced by the application of a heat source can substantially improve the macroscopic performance of the brittle material portion.

Figure 9:
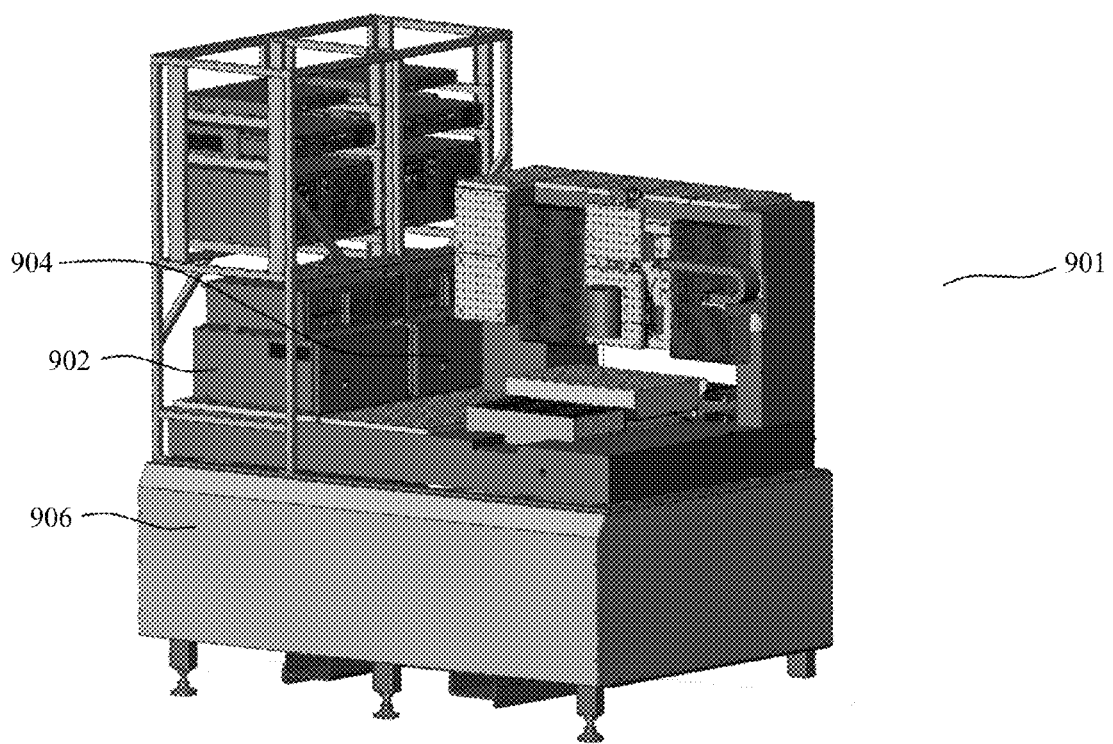
FIG. 9 illustrates a device for cutting a brittle material in accordance with some embodiments of the present invention.

FIG. 9 illustrates a device for shaping a brittle material in accordance with some embodiments of the present invention. The device includes an integrated work cell 901 that coordinates the operation of the laser beam tools 902 and 904, delivery of the laser beam tools to the brittle material work piece, feed of brittle material stock, positioning precisely the brittle material, synchronized movements of the brittle material with application of the laser beam tool(s), and auxiliary functions, such as quality inspection or work area cleanliness. The integrated work cell 901 can include the functions described above within a rigid platform 906 for process stability and consistency of the predetermined and highly controllable geometric shape and/or surface morphology of the as-shaped brittle material portion.

The work cell 901 described herein can be controlled by a computer numerical control (CNC) apparatus to coordinate various functions performed by the work cell 901. The control system can include a central processing unit (CPU), a software operating system (OS), and a mixture of digital and analog electronics to send and receive commands and communications with the work cell hardware. The control system can be operated substantially autonomously to take in the brittle material stock and produce brittle material portion(s) where the as-shaped surface has a predetermined and controllable geometric shape and/or surface morphology.

In some embodiments, the work cell control system is coupled to a communications network. In other embodiments, the work cell control system contains an internet web server. In some other embodiments, the work cell control system includes methods of remote telemetry of the constituent functional elements and/or the brittle material processing efficacy.

The present invention can be used to fabricate encapsulated through-features with an arbitrary profile in a brittle material.

Figure 10:
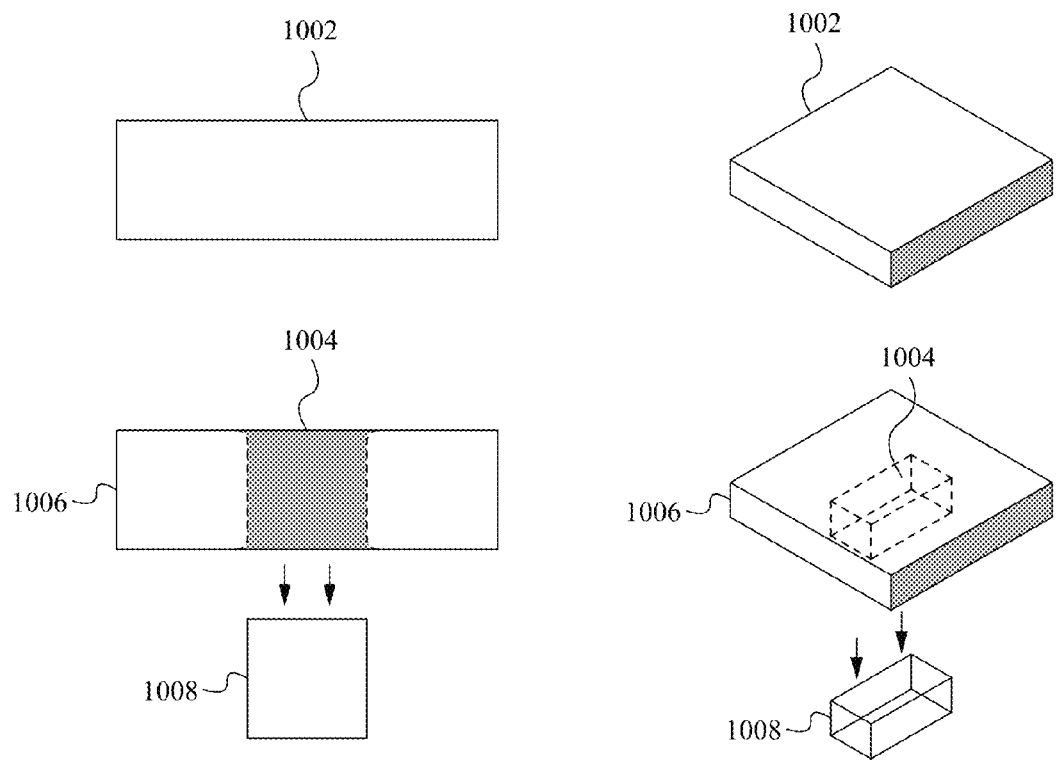
FIG. 10 illustrates a method of shaping a brittle material into a brittle material portion with an encapsulated through-feature resembling a rectangular profile with rounded corners.

FIG. 10 illustrates a method 1000 in accordance with some embodiments of the present invention. The method 1000 can shape a brittle material 1002 with an encapsulated through-feature 1004, which has a rectangular profile with rounded corners. In some embodiments, the material 1008 is removed from the substrate 1002 to form the encapsulated through-feature 1004 and residual substrate 1006 by machining the perimeter of the feature profile and removing the inner material portion 1008. In this manner, the machining method is relatively fast in comparison to a process where all of the materials within the feature profile are machined/processed. In some embodiments, the substrate 1002 comprises a material that is transparent to the femtosecond wavelength.

Figure 11:
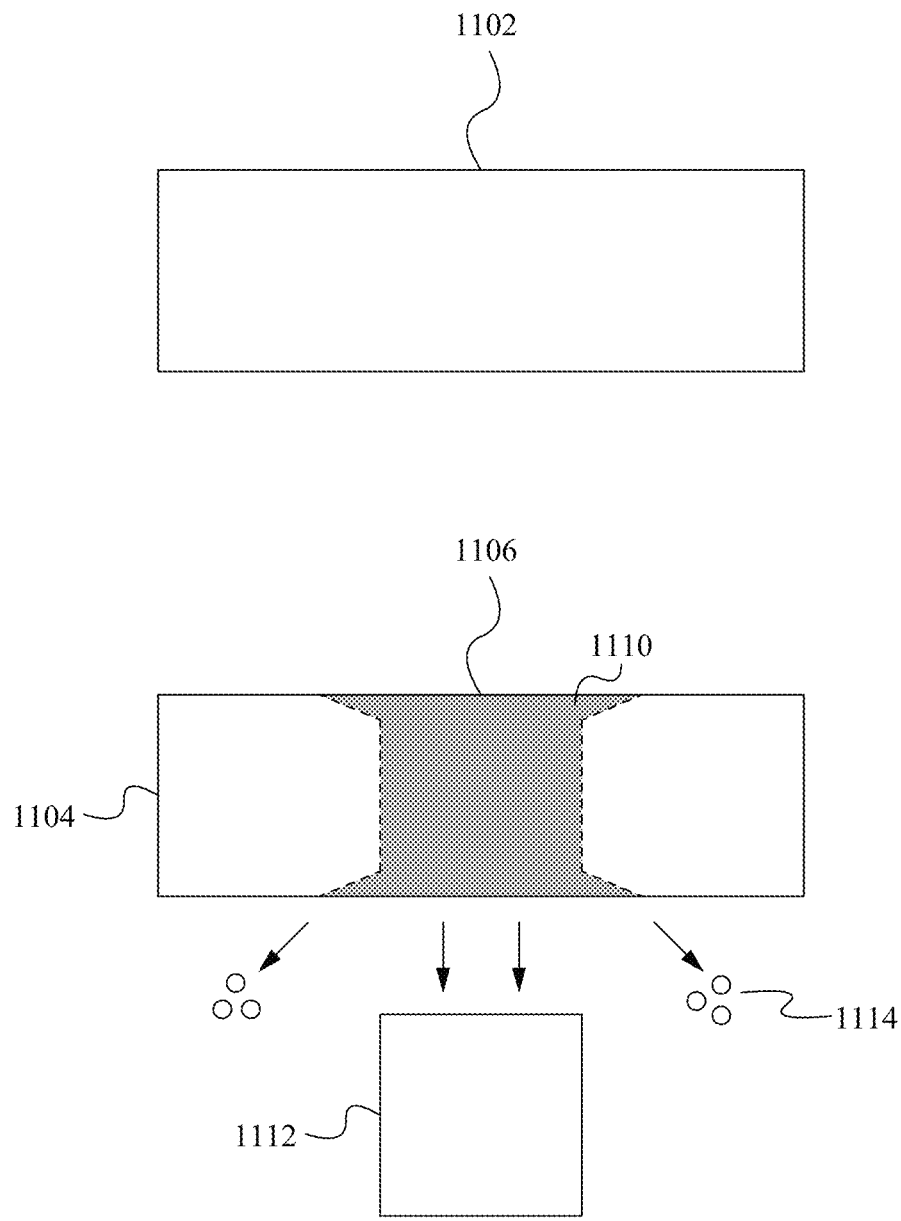
FIG. 11 illustrates a shaping method in accordance with some embodiments of the present invention.

FIG. 11 illustrates a shaping method 1100 in accordance with some embodiments of the present invention. The method 1100 can be used to shape a brittle material 1102 to an encapsulated through-feature 1106 having an angular chamfer/bevel 1110. In some embodiments, the shaping process separates the brittle material 1102 into the retained portion 1104, a large waste portion 1112, and multiple small debris portions 1114. A person of ordinary skill appreciates that any shapes are able to be formed using the methods and devices disclosed herein.

Figure 12:
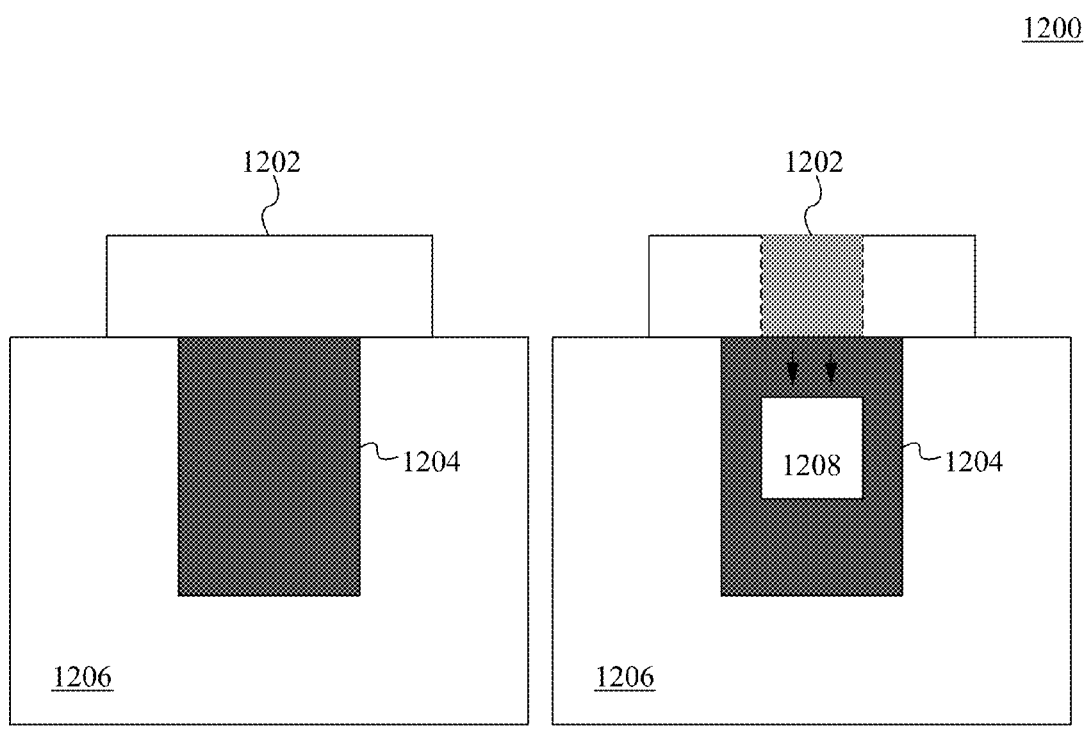
FIG. 12 illustrates an apparatus for shaping a material in accordance with some embodiments of the present invention.

FIG. 12 illustrates an apparatus 1200 for shaping a material in accordance with some embodiments of the present invention. The apparatus 1200 (a work cell) comprises a mounting chuck 1206 fixing and positing the brittle material 1202 to the apparatus. The chuck comprises a reservoir 1204 to accept the waste portion 1208 of the brittle material 1202. The reservoir can contain a gas or liquid for assisting the shaping process.

Figure 13:
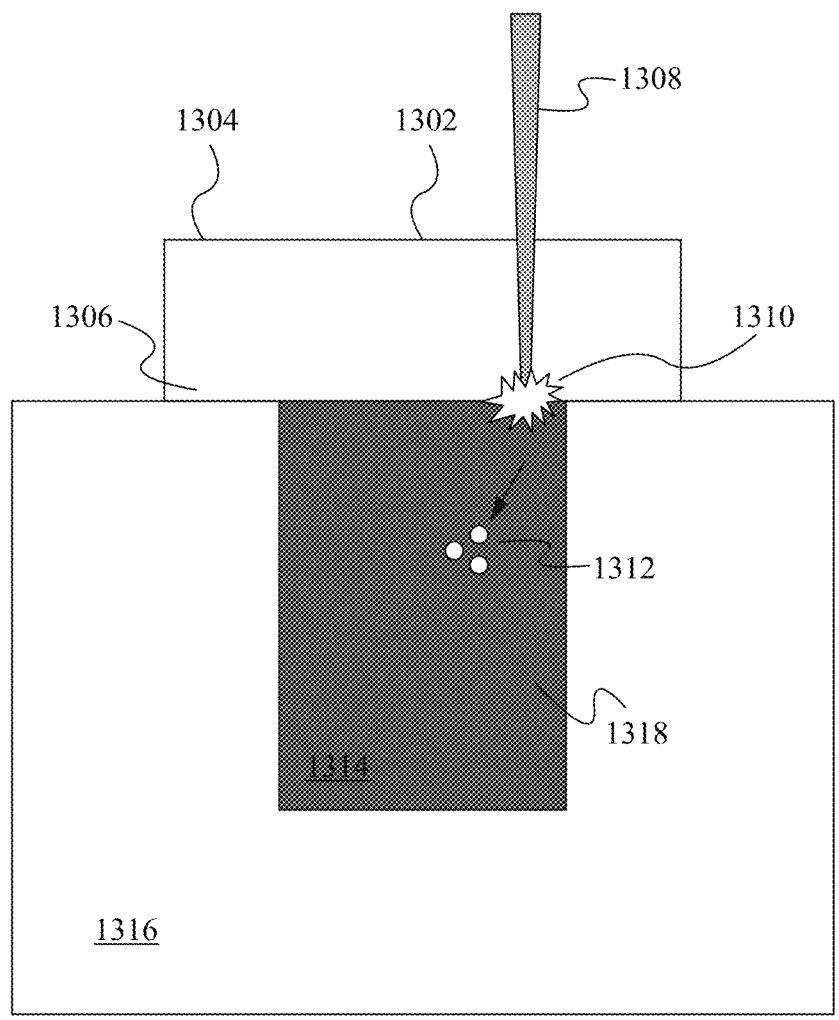
FIG. 13 illustrates a material shaping method using the apparatus in accordance with some embodiments of the present invention.

FIG. 13 illustrates a material shaping method 1300 using the apparatus 1200 in accordance with some embodiments of the present invention. In some embodiments, the brittle material 1302 is shaped with a tool path that initially shapes the material on its backside 1306 and progressively shapes the material stepwise toward its front side 1304. The brittle material 1302 is mounted onto a chuck 1316 with a reservoir 1314 filled with a liquid solution. A laser beam 1308 (such as generated by the tool 200 in FIG. 2 or any other laser device) is first directed to the backside 1306 of the brittle material and produces laser machining via ablation 1310. The liquid/fluid 1318 in the reservoir 1314 assists in the removal of debris 1312 from the brittle material 1302. The laser beam 1308 is then translated upward toward the front side 1304 in a stepwise pattern. The liquid 1318 in the reservoir can be pulled into the machined kerf/incision via capillary action/force. The presence of the liquid 1318 inside the kerf can further assist the removal of the debris 1312.

In some embodiments, the liquid 1318 comprises a non-neutral fluid, which prevents the redeposition of the nanoparticle in the ablative brittle material machining During the process of ablatively machining brittle materials (e.g., glass) with a laser, the ablated debris settles on the surface of the material/substrate. These debris are small enough to be very reactive, resulting in strong, severe debris reattachment. The ablative laser machining normally occurs near the end of the manufacturing process, after the surface has been polished, an abrasive cleaning is undesirable. Accordingly, the prevention of the debris reattachment using non-neutral fluid is an advantageous feature of the present invention. In some embodiments, the non-neutral fluid comprises a solution having a pH not equal to 7. In some embodiments, the non-neutral fluid comprises a solution having a basic solution having a pH higher than 7, such as a water solution with an amount of sodium hydroxide. In some other embodiments, the non-neutral fluid comprises a solution having an acidic solution having a pH lower than 7, such as a water solution with an amount of hydrochloric acid.

In some embodiments, the liquid 1318 comprises divalent salts, such as $CaCl_2$ and $MgCl_2$ which enhance the coagulation of silica nanoparticles (5-500 nm) and/or the debris, such that the debris reattachment to the substrate can be avoided. A person of ordinary skill in the art appreciates that any other divalent salts or any other chemicals that can facilitate the coagulation of the debris are within the scope of the present invention. The term "debris" used herein includes any particles formed during the ablation with a laser, such as a femtosecond laser. The wavelength of the femtosecond laser can be in the range from 300-2000 nm. In some embodiments, the peak of the distribution of particle size is between 90 and 150 nm. The particles can be colloidal silica or any other particles that are generated when the laser ablates a $SiO_2$ purely/based material or a glass. The sizes of the debris can be in the range from 25 nm to 500 nm.

In some embodiments, the liquid is adjusted to lower its zeta potential, such that the coagulation or flocculation of the debris (particles generated when the substrate received the laser energy) occurs. In other embodiments, the liquid is adjusted to have/close to/near isoelectric point, such that the coagulation or flocculation of the debris occurs. In some other embodiments, the liquid is adjusted to lower the stability of the colloid in the solution, such that the coagulation or flocculation of the debris occurs. In some embodiments, the zeta potentials are brought to below 10 mV, such that coagulation or flocculation occurs. In some other embodiments, the zeta potentials are brought to below 5 or between 0-5 mV to facilitate the coagulation or flocculation.

In some embodiments, the solution is adjusted to have a pH between 2.0 to 3.4. In other embodiments, the solution is adjusted to have a pH between 2.0 to 3.0. In some other embodiments, the solution is adjusted to be in an acidic condition. In some embodiments, the solution contains sulfuric acid having a pH around 1.0, such that the debris does not reattach to the substrate. In some other embodiments, the solution contains citric acid having a pH around 2.0-3.0, such that the debris does not reattach to the substrate.

A person of ordinary skill in the art appreciates that any chemicals that can be used to facilitate the removal of the debris or particles floating in the solution are within the scope of the present invention, such as adding NaCl, $CaCl_2$, $MgCl_2$, or any other salts.

Figure 13A:
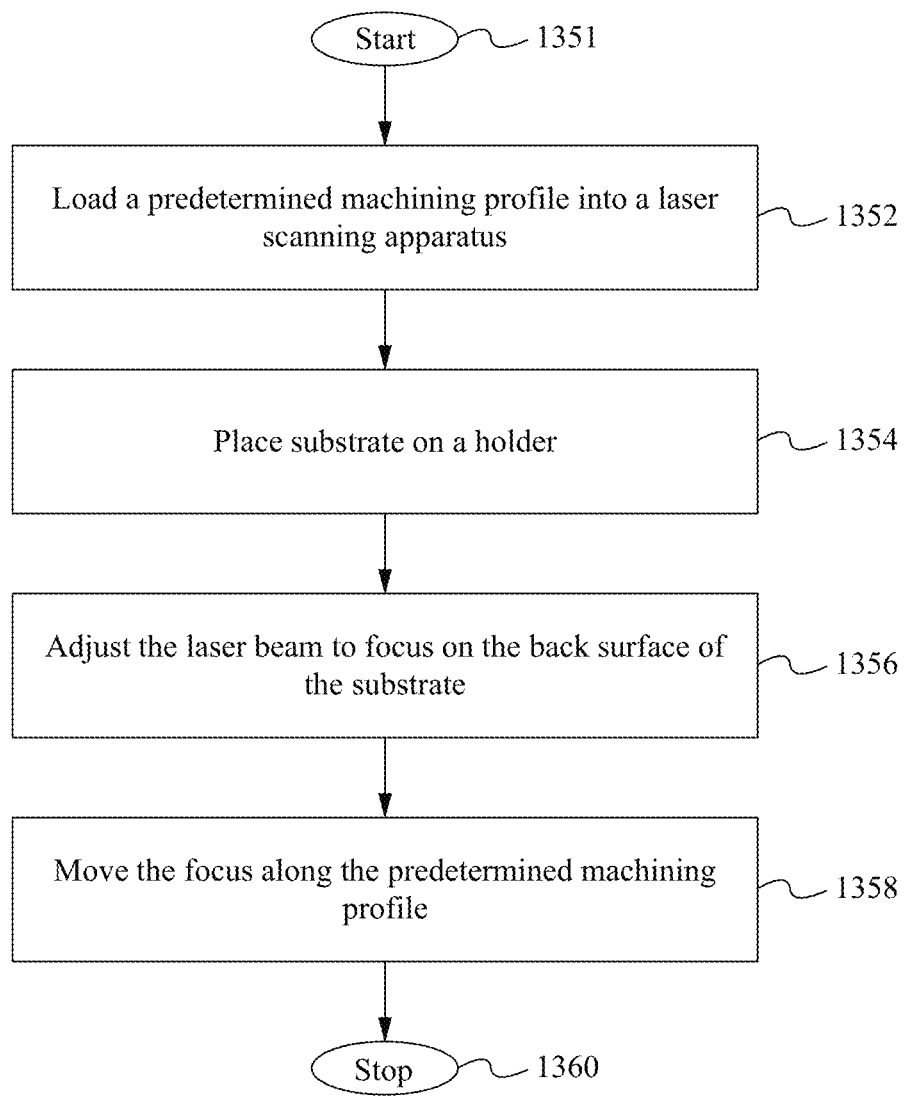
FIG. 13A is a flow chart illustrating a encapsulated through-feature forming method in accordance with some embodiments of the present invention.

FIG. 13A is a flow chart illustrating an encapsulated through-feature forming method 1350 in accordance with some embodiments of the present invention. The method can start from a step 1351. At Step 1352, a predetermined machining profile is loaded into a laser scanning apparatus. The predetermined machining profile can be any through-features to be cut out from a substrate. At Step 1354, the substrate is placed on a holder. The back of the holder is open and the back surface of the substrate, such as a brittle material, is in contact with a liquid. At Step 1356, the laser beam is adjusted to focus on the back surface of the substrate. At Step 1358, the focus is moved upward until to the top of the substrate and repeat the process along the predetermined machining profile. The liquid aids in machining and the removal of the debris. When the machining is completed, the waste generated falls out due to gravity. The through-features can be any shapes or features, such as a dual-chamfered edge. The method can be used to form chamfers in any angles in any degrees, such as 45 degree, any predetermined depth, round chamber of a predetermined radius, or a concave chamfer.

Figure 14A:
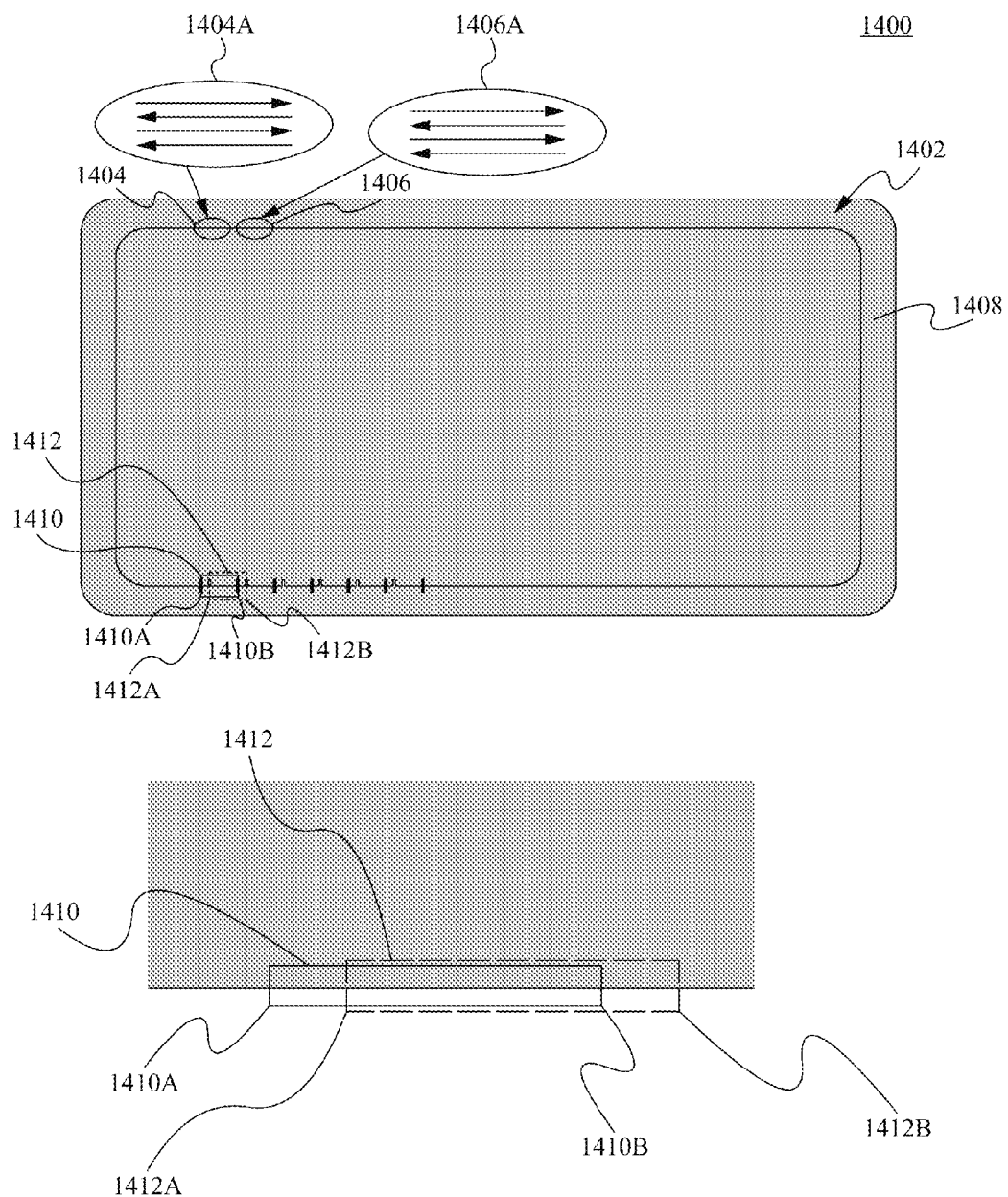
FIGS. 14A-14C illustrate a material shaping method 1400 with predetermined paths and patterns.
Figure 14B:
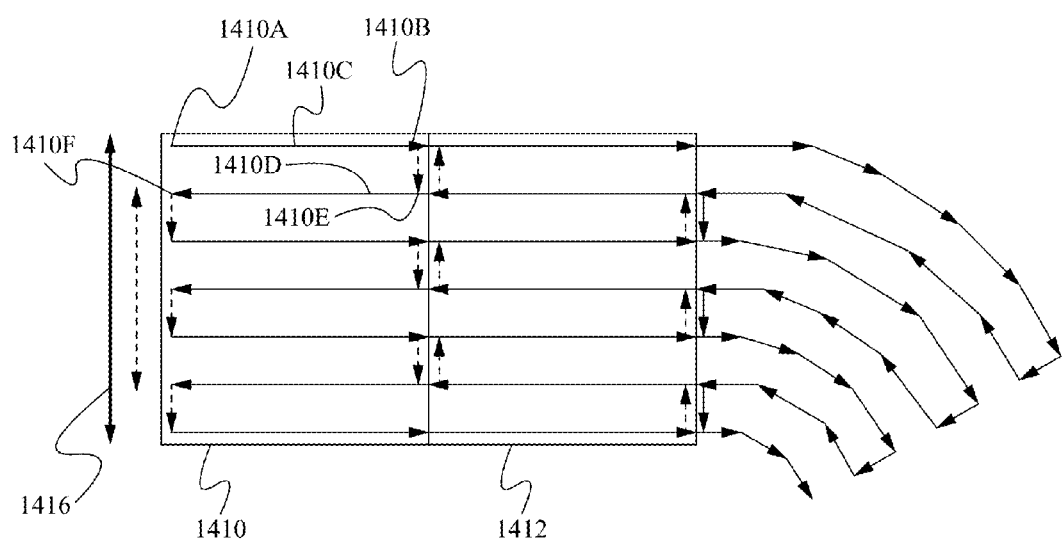
Figure 14C:
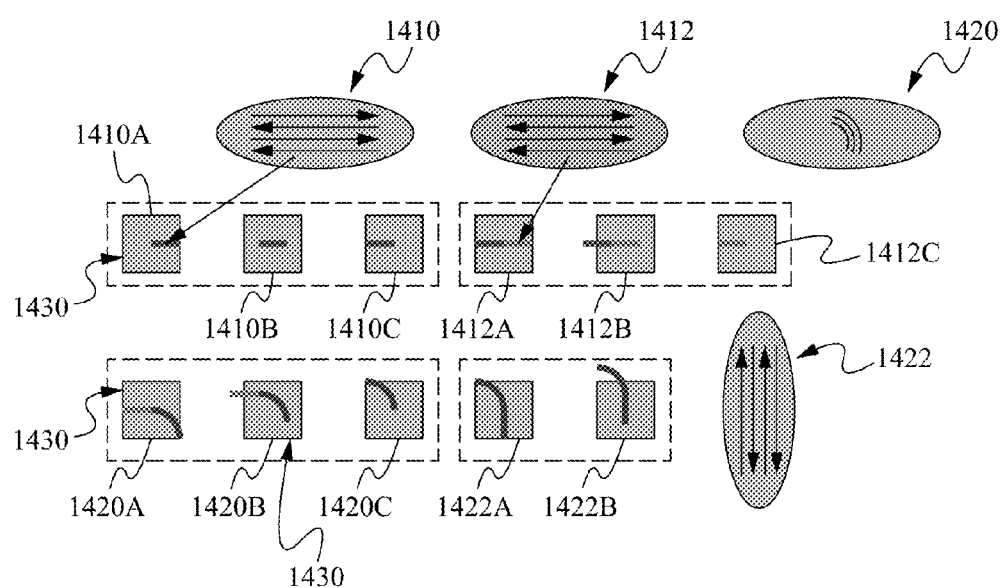

FIGS. 14A-14C illustrate a material shaping method 1400 with predetermined paths and patterns. The method 1400 can use laser beams making various scanning patterns to shape the substrate 1408. In some embodiments, the scanning patterns contains a raster scan pattern.

In some embodiments, the laser device keeps the tool fixed and translates the brittle material with respect to the laser device (tool) in order to form a tool path. In some other embodiments, the laser device provides a coordinated combination of scanning/moving the tool and translating the brittle material.

The method disclosed herein can be used for forming a large-area chamfer. In some embodiments, the present invention divided the full chamfer into smaller chucks/zones. In some embodiments, the chucks/zones are ½ of the size of the lens field-of-view (FOV). Further in some embodiments, each of the chamfer chucks are divided into layers, where the stack of the layers forms the predetermined 3D profile of the chamfer. In some embodiments, a laser scan/beam is set to scan a layer of one the chucks with a single laser scan pattern. Each of the scan pattern is indexed to a specific starting location on the material perimeter of the substrate. The index locations of subsequent layers are offsets by a specific amount, such that any and all edge effects are averaged out over the full pattern, resulting in a smooth and constant chamfer around the entire part. A computer software can be programmed to form the predetermined chamfer profile. In some embodiments, a stage encoder positions are fed into the scan controller so that both the stage and scanner can be moving during the formation of the chamfer.

FIG. 14A illustrates forming a scanning pattern in accordance with some embodiments of the present invention. A laser beam is applied on the substrate 1408 to form a shape 1402 of a protective glass cover of a consumer electronic device. The formation of the shape 1402 is performed section-by-section along the contour of the shape 1402. The section 1404 is first scanned with a Raster pattern within an area 1404A of the section 1404. Next, the section 1406 is scanned with a Raster pattern with an area 1406A of the section 1406. In some embodiments, each of the sections 1404 and 1406 are few microns (such as 3-10 microns) in its length.

In some embodiments, the scanning sections 1404 and 1406 are staggered to minimize and/or avoid edge effects. For example, a scanning section 1410 has an overlapping area with the scanning section 1412. The scanning section 1410 can begin from the point 1410A and end at 1410B. After the scanning laser beam reaches point 1410B, the beam shifts down and scans in the reverse direction back to the point 1410A. The similar pattern is performed until the predetermined Raster pattern has been performed within the area section 1410. After the completion of the section 1410, a second section 1412 is formed with a similar pattern as described above. The beginning point 1412A of the section 1412 overlaps at least a portion of the area of section 1410 to minimize or avoid the edge effects.

FIG. 14B illustrates the scanning sequences of the Raster pattern in accordance with some embodiments of the present invention. The scanning by laser beams begins from point 1410A to 1410B (horizontally from left side to right side) forming a scanning path 1410C. Next, the scanning point begins from 1410E, which is vertically downward shifted with a portion of a Raster width, to 1410F (horizontally from right to left) forming a scanning path 1410D. The scanning path 1410C and 1410D are parallel to each other. Following the similar process until the entire section 1410 is scanned, such that a first area section 1410 is completed for scanning Next, the area section 1412 is scanned with the same process as described for the section 1410. In some embodiments, the Raster width 1416 described above is twice as long as the length of the scanning path 1410C. A person of ordinary skill in the art would appreciate that the scanning length and gaps between the scanning paths can be in any sizes, such as from 0.5 micron to 5 micron. The Raster scanning patterns are also applicable to scan curve lines or any other shapes.

FIG. 14C illustrates a scan pattern progression in accordance with some embodiments of the present invention. In some embodiments, two motion patterns (e.g., laser beam and the substrate) occurring simultaneously. The laser beam is moving and/or scanning across the field defined by the box 1430. The substrate is moving with respect to the box 1430, such that the scanning field covers a new portion of the substrate continuously. Both laser beam and the substrate are constantly moving. A laser beam in raster scan pattern 1410, 1412, and 1420 is applied to each line segment area within the box 1430 with multiple sweeps to remove multiple depth layers of materials from a discrete transverse profile. While the part that is moving with respect to the scan field as the raster scan is taking place, one or more control algorithms and executable computer instructions stored in a computer tracks where to scan the laser beam so that the actual laser beam application area remains stationary on the part, even though the part is moving. Once a segment (such as line 1410A) is complete, the scanner directs the laser beam to the next segment which is entered the scan field.

The following is an example of a laser scanning process. As described above, a portion of the area section 1410 overlaps with the area section of 1412 (FIG. 14A). The scanning of the section 1410 can start at right side portion 1410A. The second scanning beam can be applied in the center portion 1410B. The third scanning beam can be applied to the left side portion 1410C of the section 1410. The second group of scanning can begin, similar to the scanning pattern applied to the section 1410, at the right side portion 1412A, which connects to the left side portion 1410C. A second scanning beam of the second group of scanning is applied in the center 1412 of the section 1412. A third scanning beam of the second group of scanning is applied at the left side portion 1412C of the section 1412. Similar patterns are applied when forming curved patterns 1420, starting from right bottom corner 1420A, center 1420B, and then 1420C of the left top corner. The vertical shaping can follow similar pattern described above by continuing the shaping line of left top corner 1420C and performing bottom shaping pattern 1422A and center shaping pattern 1422B. Similar process can be performed along the predetermined profile line of the predetermined shape.

Figure 15:
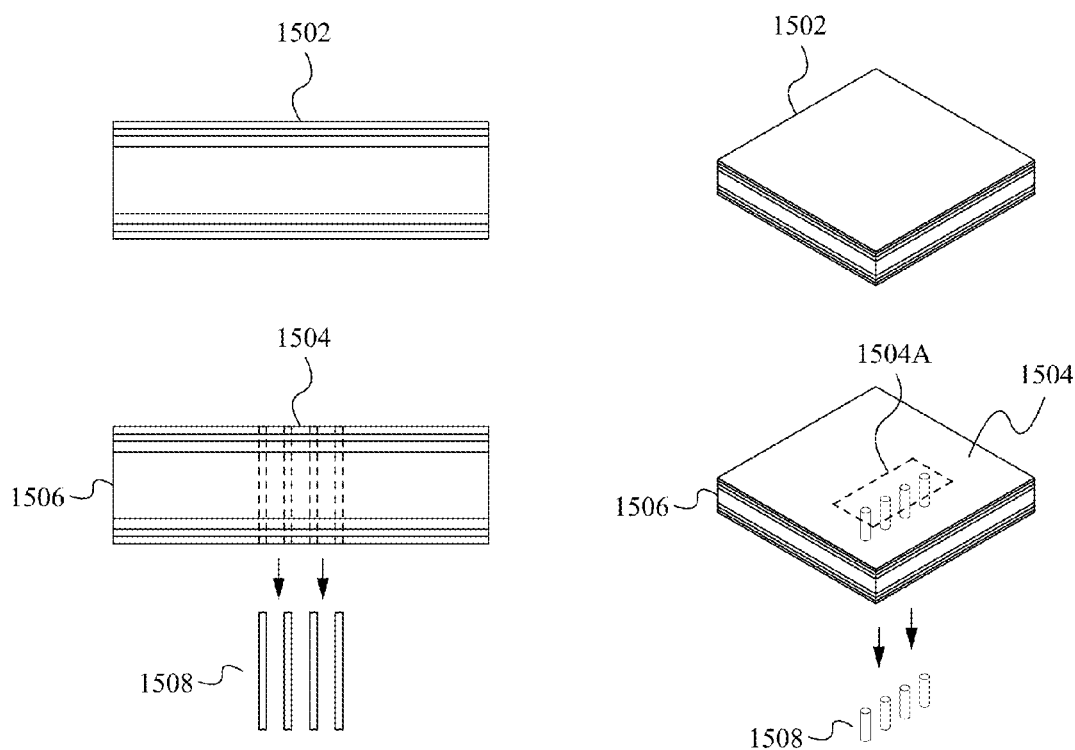
FIG. 15 illustrates encapsulated through-holes shaping method, which can us used to shape a layered brittle material.

FIG. 15 illustrates encapsulated through-holes shaping method 1500, which can be used to shape a layered brittle material 1502. The laser apparatus described above is able to be used to form one or more through-holes 1504 with pre-determined characteristic dimensions, such as hole diameter and center-to-center spacing. In some embodiments, the through-holes are arranged in an array having an acoustic transfer function for the resultant brittle material portion 1506, such as the speaker or microphone portals in a smart phone. The encapsulated through-hole array 1504A can be fabricated by shaping the brittle material in a specific hole-by-hole order generating debris 1508, in order to control mechanical or chemical coupling between shaping steps. The through-holes can be shaped using a predetermined algorithm that minimizes deleterious stress profiles in the brittle material. In some embodiments, the method can be used to cut/separate the material into separate portions.

Figure 16:
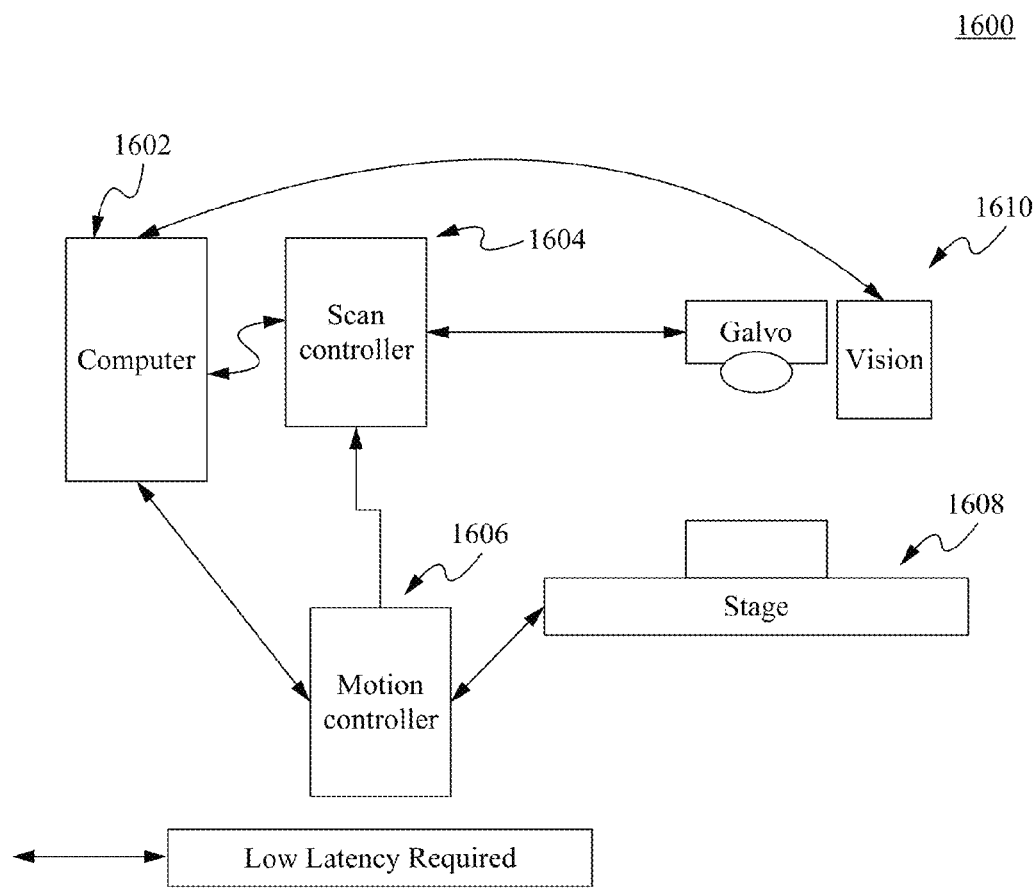
FIG. 16 illustrates a system for shaping brittle materials.

FIG. 16 illustrates a system 1600 for shaping brittle materials. The system 1600 comprises a computer 1602, a scan controller 1604, motion controller 1606, a stage 1608, a optical controlling elements 1610, such as galvo that drives mirrors for steering the laser beams. The computer can command the motion controller 1606 for a motion of the stage 1608 and command the scan controller 1604 to emit laser beams based on the configurations of the optical elements 1610.

Figure 17:
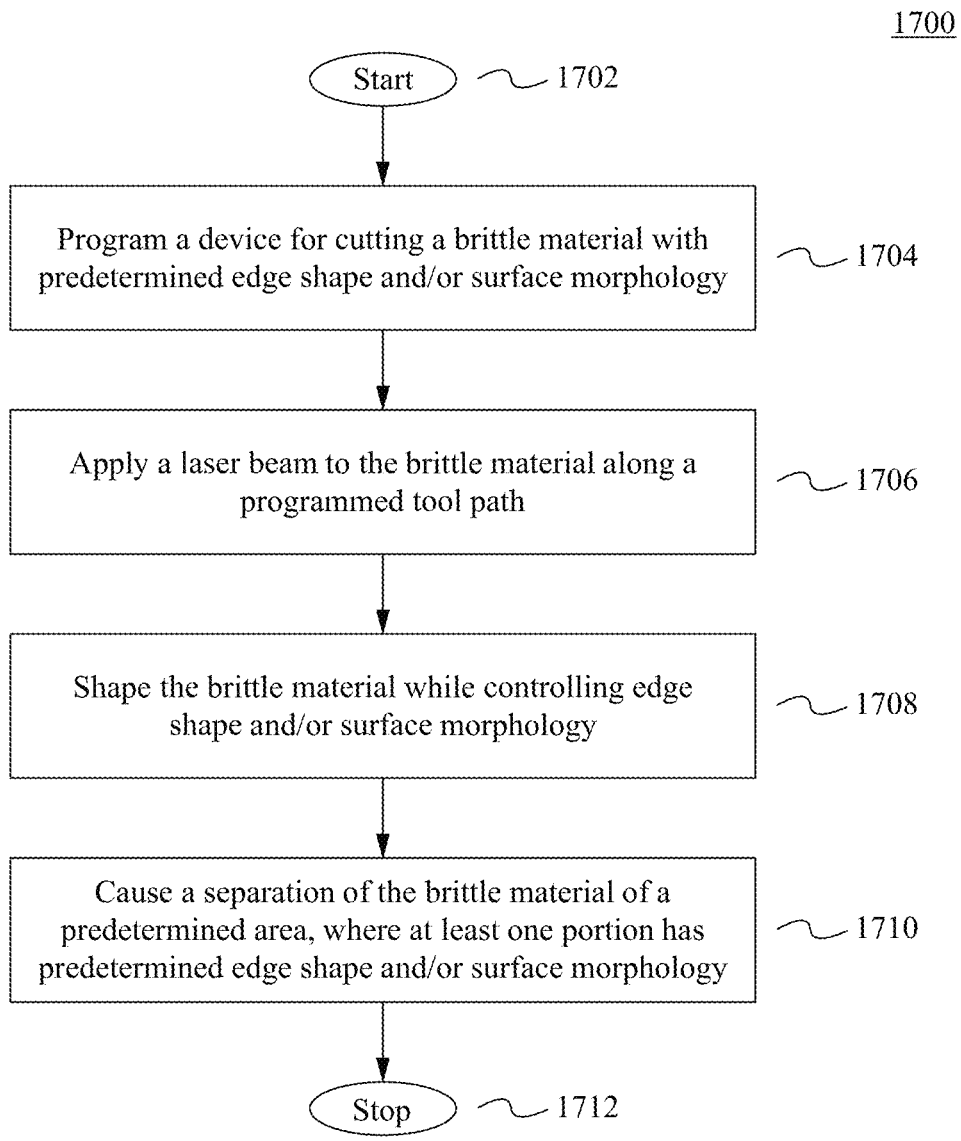
FIG. 17 is a flow chart illustrating shaping a brittle material method using a laser beam in accordance with some embodiments of the present invention.

FIG. 17 is a flow chart illustrating cutting a brittle material method 1700 using a single laser in accordance with some embodiments of the present invention. The method 1700 starts from a step 1702. In a step 1704, a device is programmed for shaping a brittle material with predetermined edge shape and/or surface morphology. In a step 1706, a laser beam is applied to the brittle material along a programmed tool path. In a step 1708, the brittle material is shaped with a controlled edge shape and/or surface morphology. In some embodiments, the controlled edge shape and/or surface morphology is formed on the brittle material via the laser induced breakdown of a portion of the brittle material. In a step 1710, a separation of a predetermined area of the brittle material is performed, where at least one portion of the predetermined area has predetermined edge shape and/or surface morphology. In some embodiments, the separation is done by using the laser. In some other embodiments, the separation is done by using a mechanical force. The method 1700 stops at a step 1712.

The methods and devices disclosed herein provide many advantageous aspects in commercial and/or industrial uses such that the surface of the shaped brittle material does not require additional after-shaped treatment process. In contrast, typical methods and devices require many after-shaped mechanical treatment steps, such as grinding, polishing, etching, annealing, chemical bath, and ion-exchange treatments.

Further, the methods and devices disclosed herein are able to make through-hole features and/or various shapes, such as chamfer, on a brittle material.

The methods and devices disclosed herein are able to be utilized to shape any amorphous solid materials, such as glass cover for electronic devices, solar panel, ITO (indium tin oxide), soda-lime glasses, windows, and wind shield of an automobile.

In operation, the method of the present invention comprises providing a stock of brittle material and applying one or more laser beams (such as femtosecond laser beams) to a portion of the brittle material causing the separation of the material into two or more portions in a way that precisely controls the geometric shape and/or surface morphology of the edge(s) of at least one of the separate portions.

The present invention has been described in terms of specific embodiments incorporating details to facilitate the understanding of principles of construction and operation of the invention. Such reference herein to specific embodiments and details thereof is not intended to limit the scope of the claims appended hereto. It is readily apparent to one skilled in the art that other various modifications can be made in the embodiment chosen for illustration without departing from the spirit and scope of the invention as defined by the claims.

What is claimed is:

1. A method of laser processing a stock of brittle material, the stock of brittle material having a front surface and an opposite back surface, the method comprising:
   placing the stock of brittle material in a manner so that the back surface thereof is in fluid contact with a liquid solution held in a reservoir, the liquid solution having a zeta potential of less than about 10 mV;
   applying an ultrafast laser beam to the stock of brittle material, the ultrafast laser beam comprising one of femtosecond or picosecond laser pulses, the ultrafast laser beam incident on the front surface of the stock of brittle material, the ultrafast laser beam having a focus, the focus located on the back surface of the stock of brittle material; and
   translating the focus of the ultrafast laser beam from the back surface of the stock of brittle material towards the front surface of the stock of brittle material, the focused ultrafast laser beam removing material from the stock of brittle material by ablation, the material removed by ablation being in the form of debris particles, the liquid solution coagulating the debris particles in the liquid solution, the liquid solution thereby preventing the material removed by ablation from reattaching to the stock of brittle material.

2. The method of claim 1, wherein the liquid solution includes a salt.

3. The method of claim 2, wherein the salt is any one of $CaCl_2$, $MgCl_2$, and NaCl, or a combination thereof.

4. The method of claim 2, wherein the salt is a divalent salt.

5. The method of claim 1, wherein the liquid solution has a non-neutral pH value.

6. The method of claim 1, wherein the liquid solution has a pH value lower than 5.

7. The method of claim 1, wherein the debris particles removed by ablation are one of nanoparticles and microparticles, or a combination thereof.

8. The method of claim 1, wherein the material removed by ablation is colloidal silica.

9. The method of claim 1, further comprising scanning the ultrafast laser beam along a tool path while repeating the applying and translating steps.

10. The method of claim 1, wherein the ultrafast laser beam comprises picosecond laser pulses.

11. The method of claim 1, wherein the ultrafast laser beam comprises femtosecond laser pulses.

12. The method of claim 1, wherein the laser processing forms a through hole or slot in the stock of brittle material.

13. The method of claim 12, wherein the through hole or slot has a chamfer.

14. The method of claim 12, wherein the through hole or slot has edges that are round in shape, the round shape having a radius of curvature.

15. The method of claim 1, wherein the stock of brittle material comprises a multiple layered structure of brittle material.

16. The method of the claim 15, wherein the focused ultrafast laser beam is applied to one layer of the multiple layered structure of brittle material.

17. The method of claim 1, wherein the stock of brittle material is made of glass.

18. The method of claim 1, wherein the stock of brittle material is made of a consumer electronic protective glass.

19. The method of claim 1, wherein the stock of brittle material is made of sapphire.

* * * * *